E. S. CHURCH.
CASH AND CREDIT REGISTER.
APPLICATION FILED OCT. 11, 1906. RENEWED SEPT. 14, 1914.
1,136,101.
Patented Apr. 20, 1915.
10 SHEETS—SHEET 4.
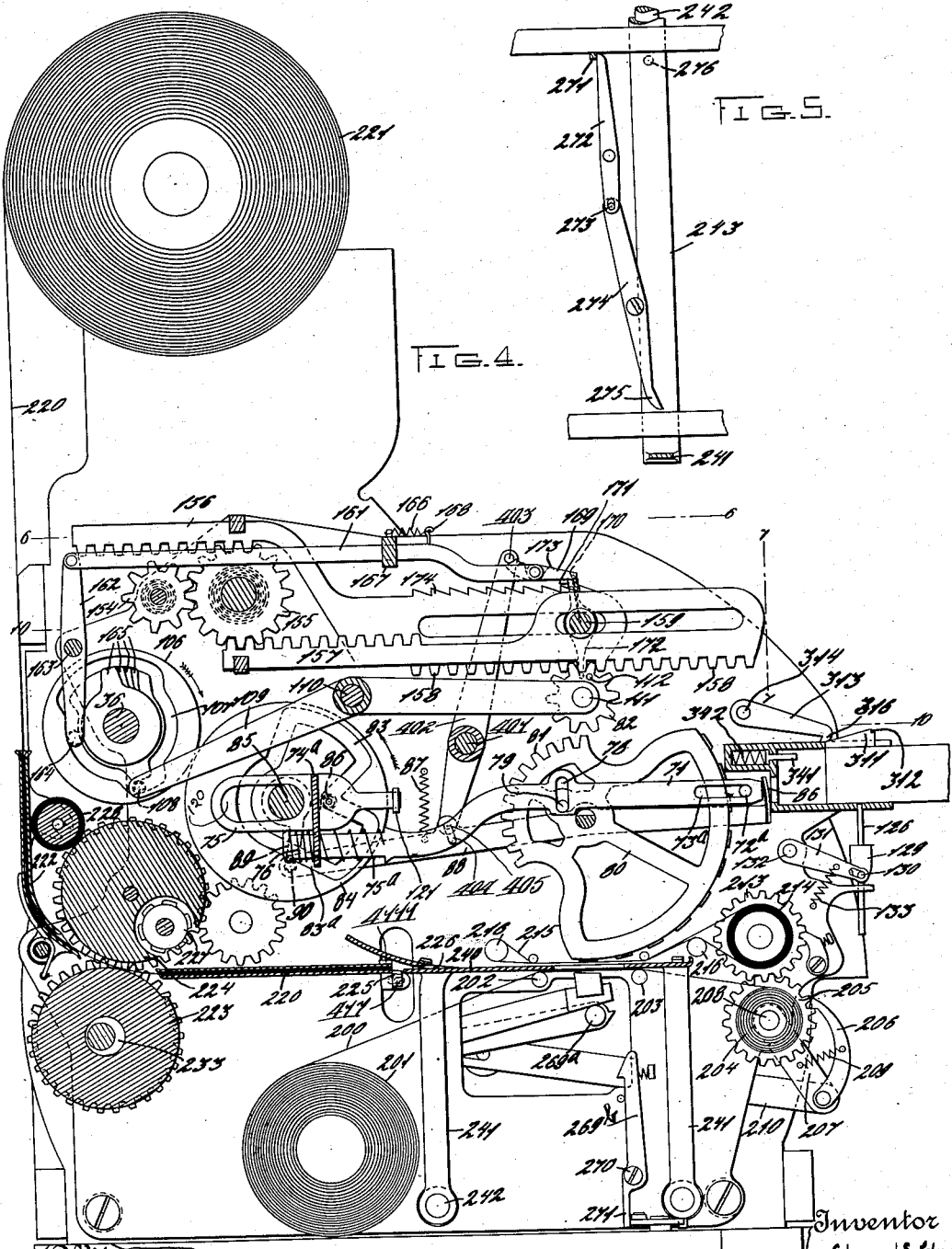

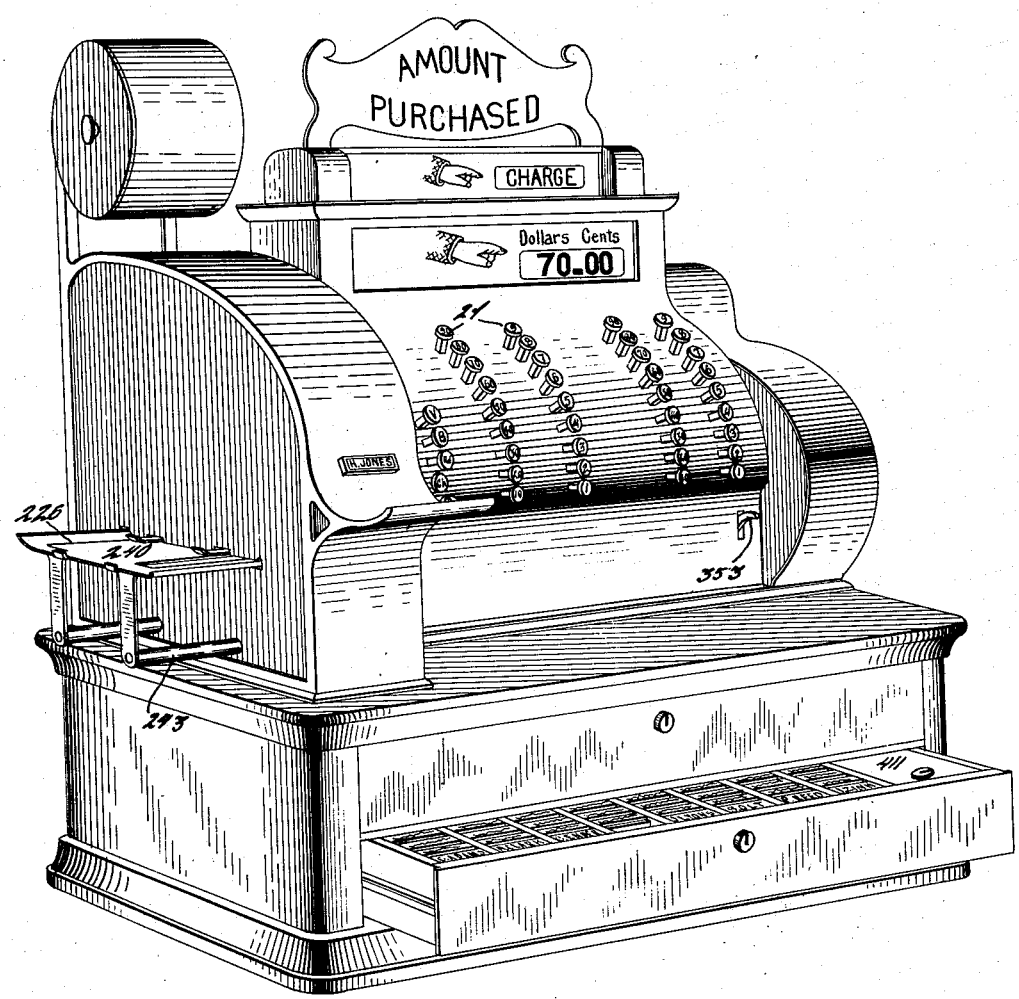

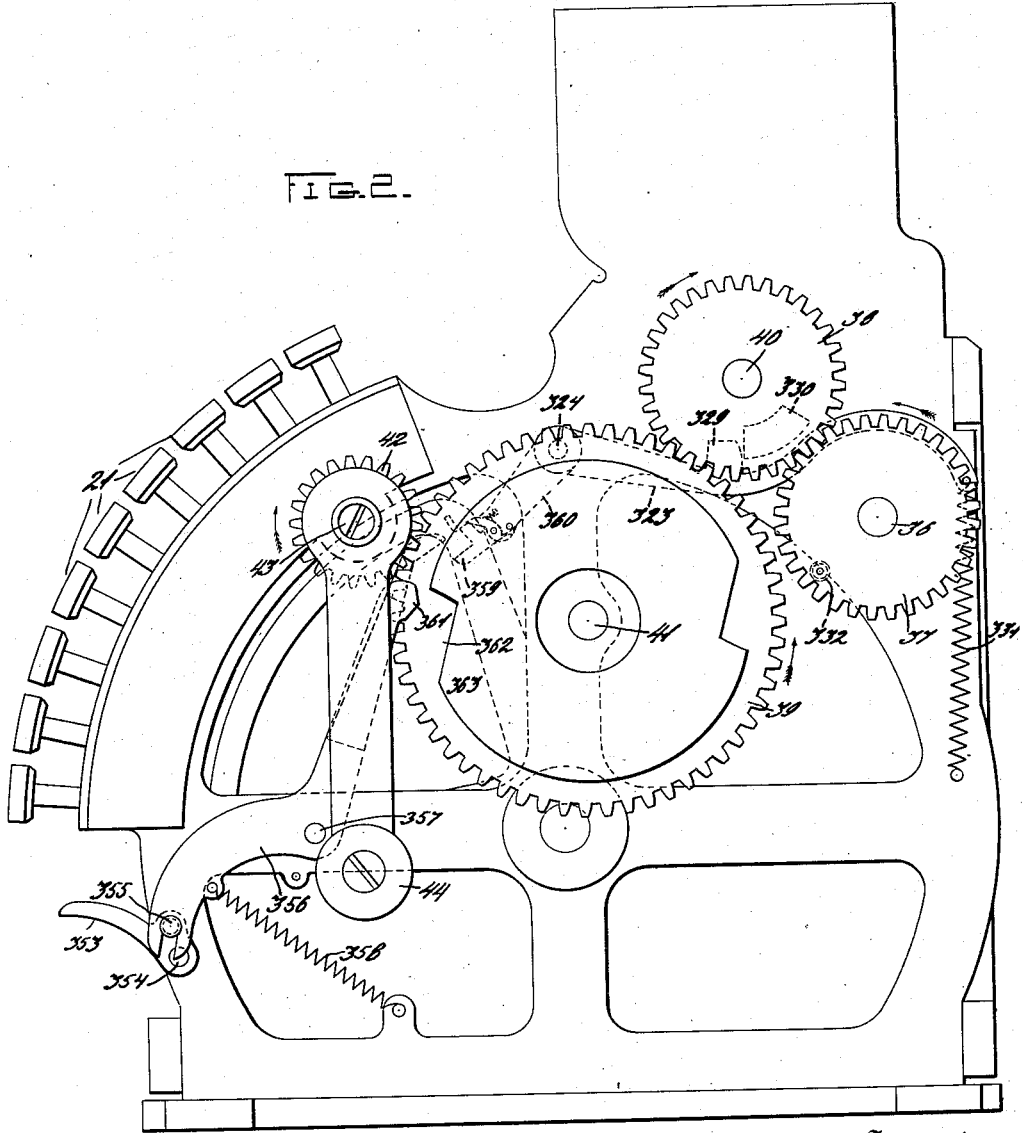

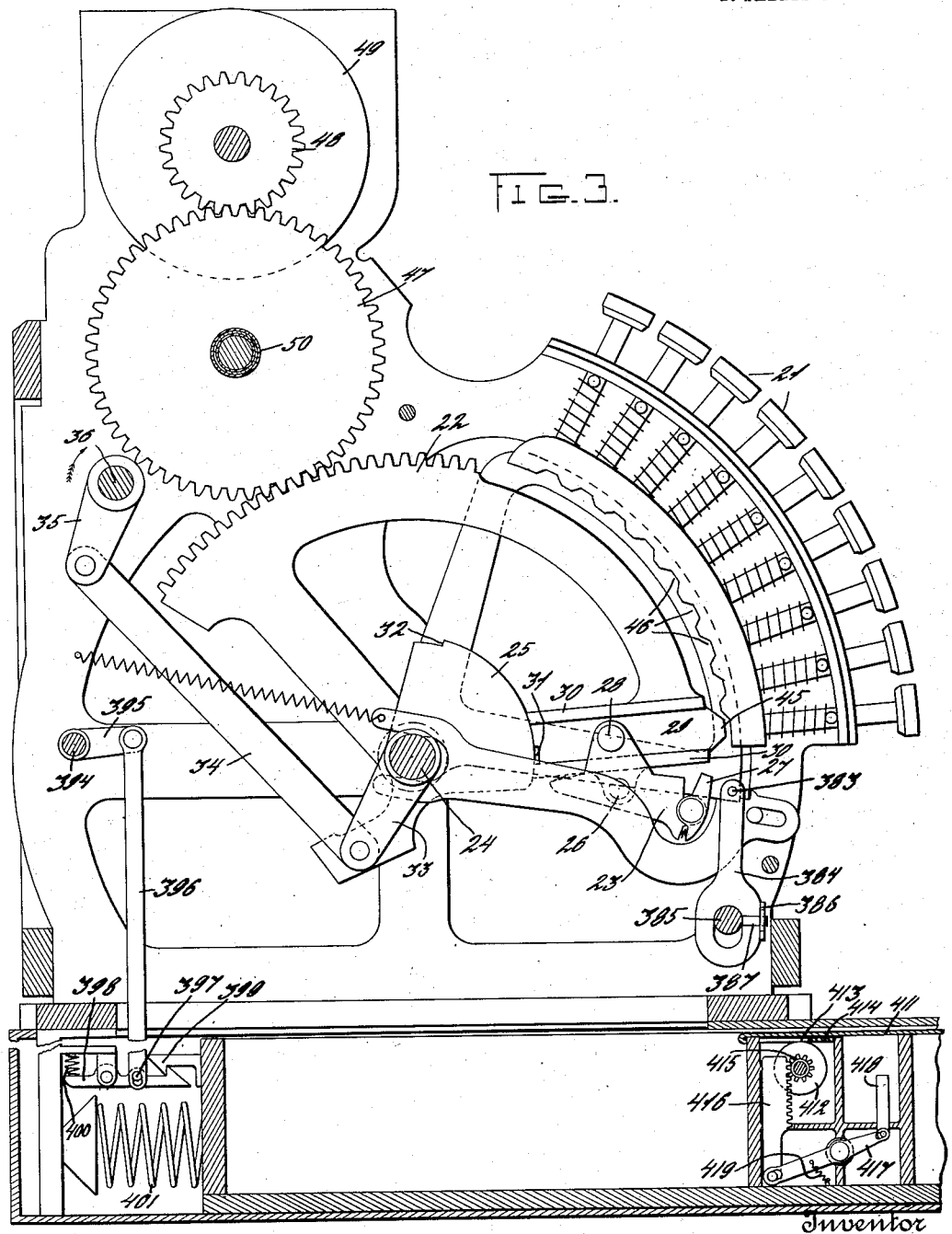

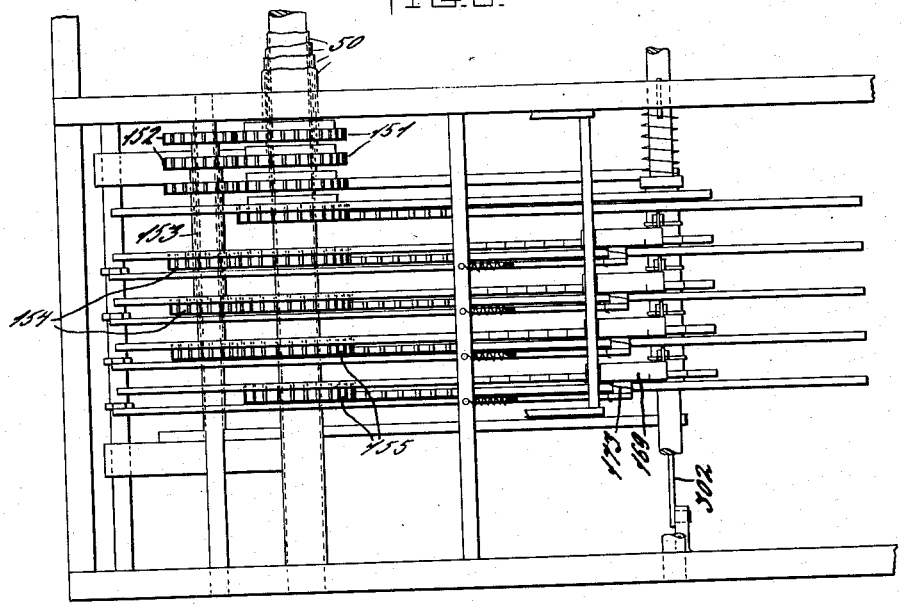
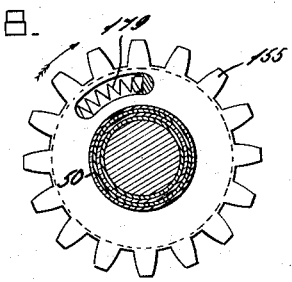
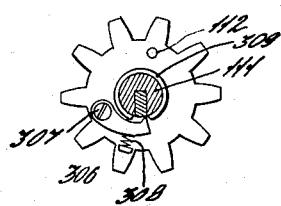
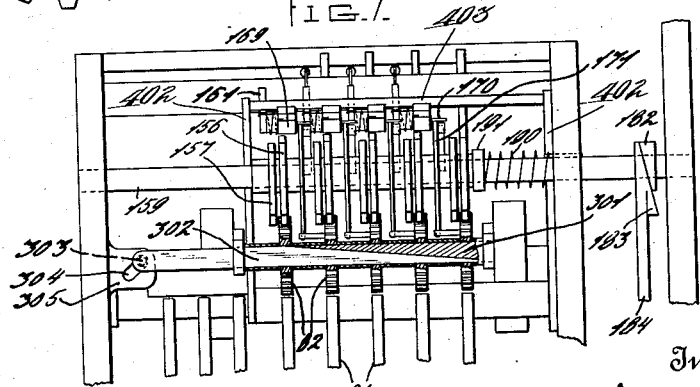

E. S. CHURCH.
CASH AND CREDIT REGISTER.
APPLICATION FILED OCT. 11, 1906. RENEWED SEPT. 14, 1914.
1,136,101.
Patented Apr. 20, 1915.
10 SHEETS—SHEET 6.
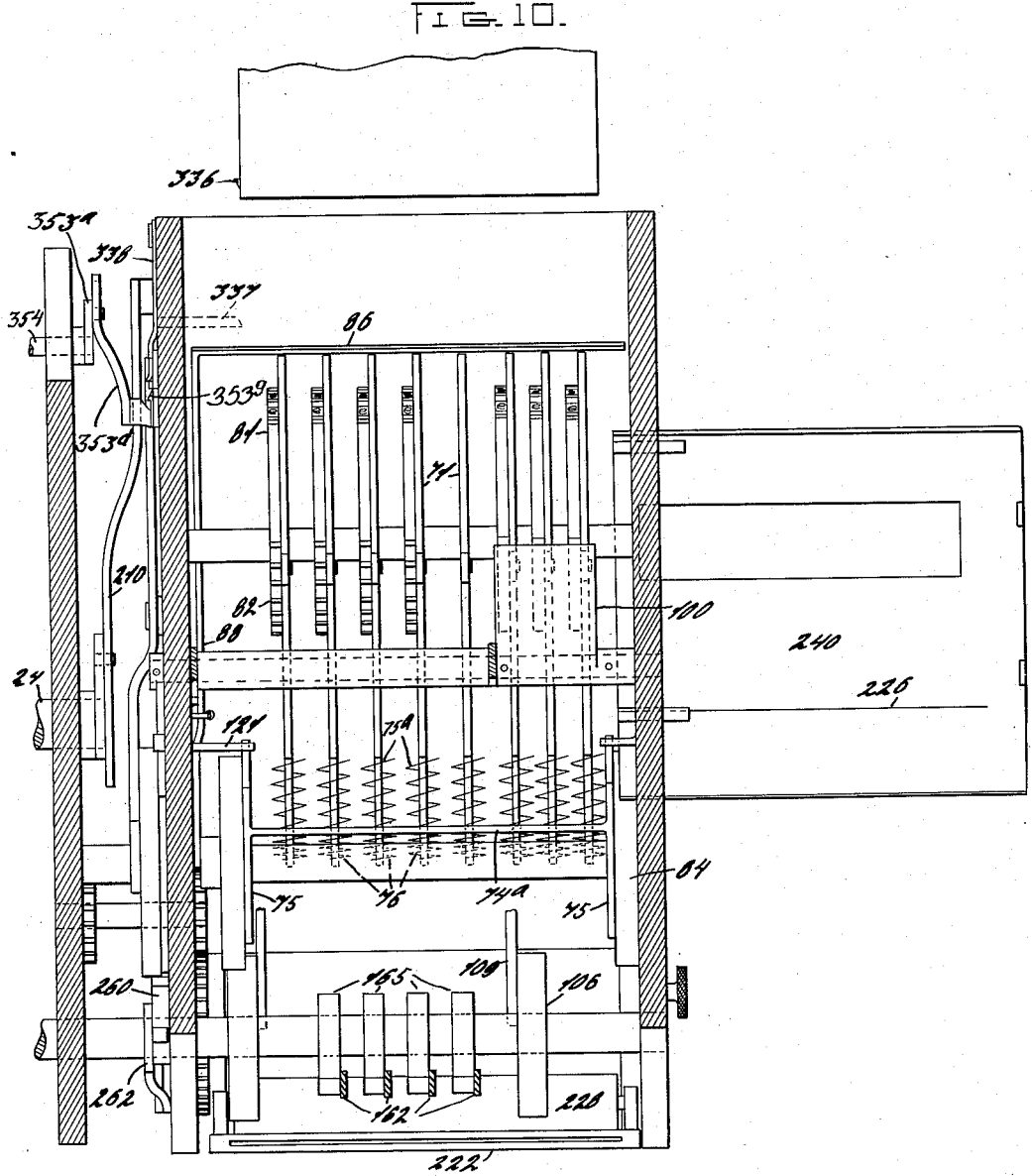
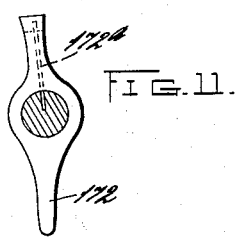

E. S. CHURCH.
CASH AND CREDIT REGISTER.
APPLICATION FILED OCT. 11, 1906. RENEWED SEPT. 14, 1914.
1,136,101.
Patented Apr. 20, 1915.
10 SHEETS—SHEET 7.
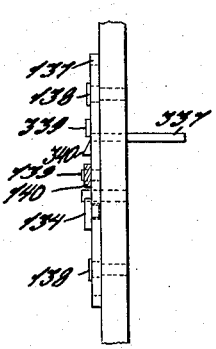
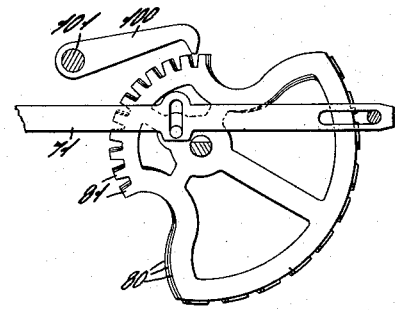
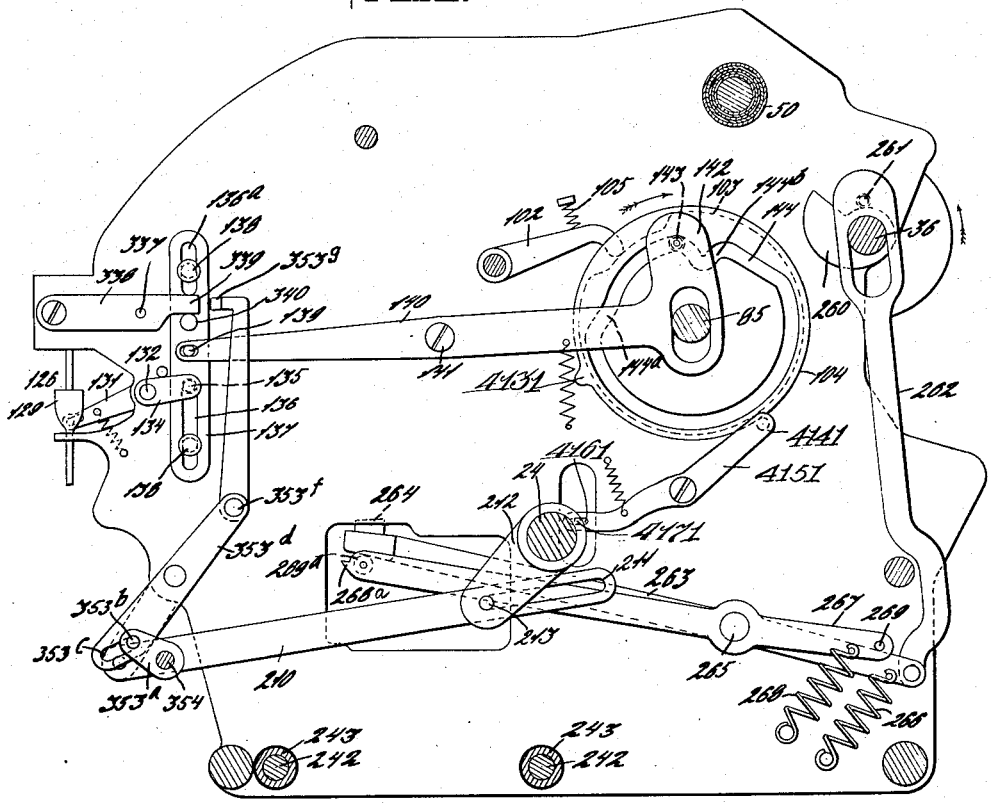

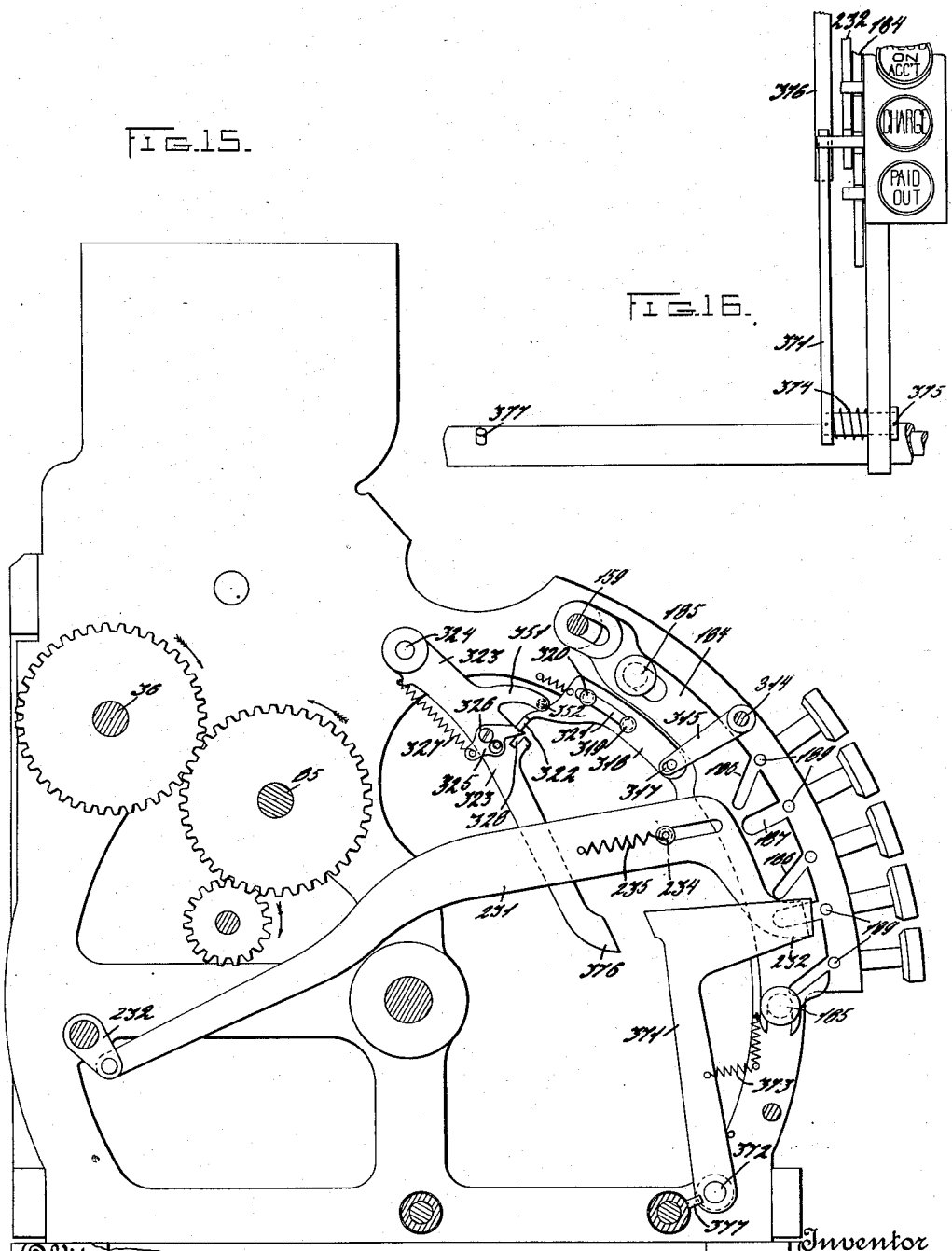

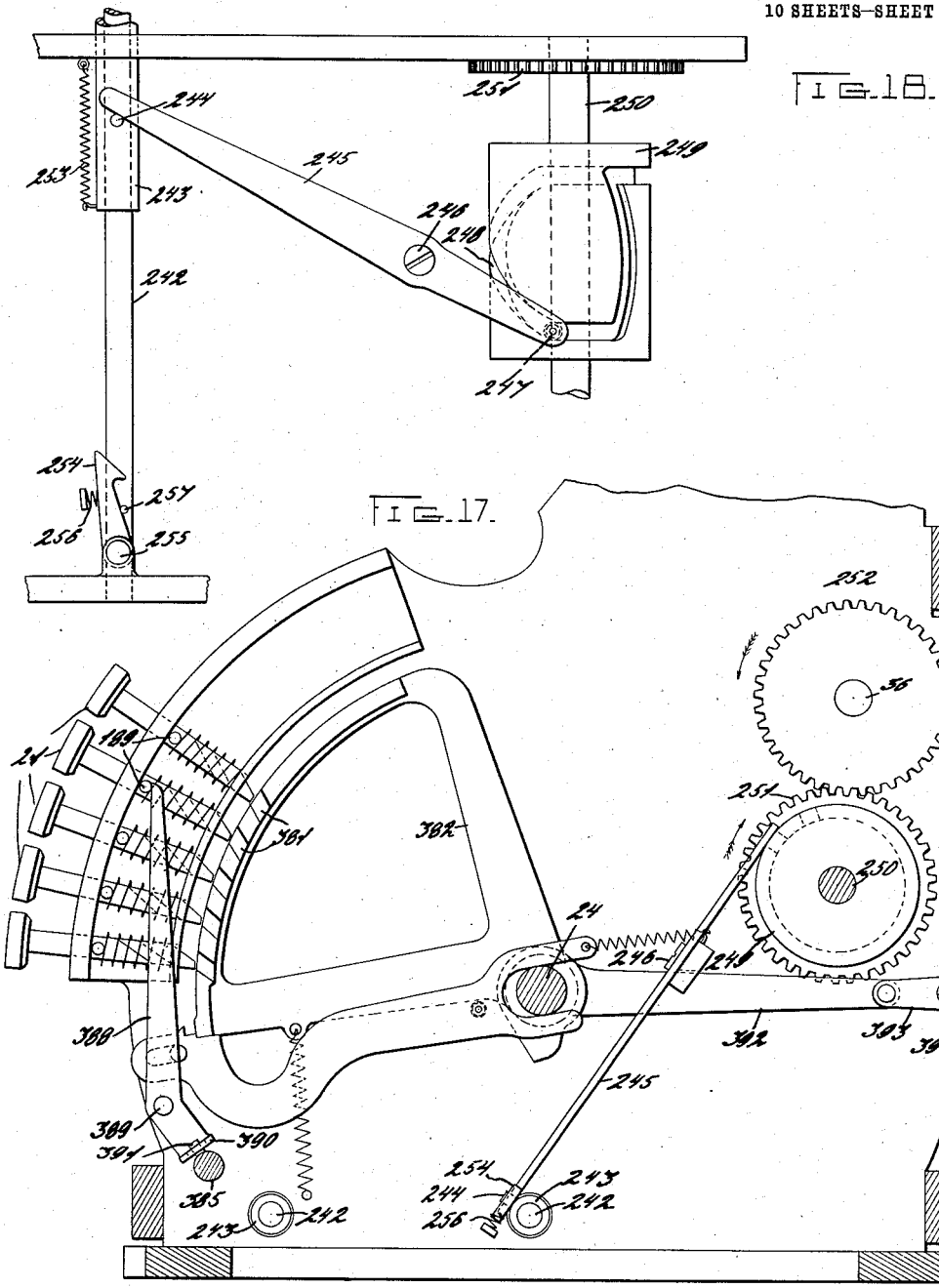

E. S. CHURCH.
CASH AND CREDIT REGISTER.
APPLICATION FILED OCT. 1:, 1906. RENEWED SEPT. 14, 1914.
1,136,101.
Patented Apr. 20, 1915.
10 SHEETS—SHEET 10.
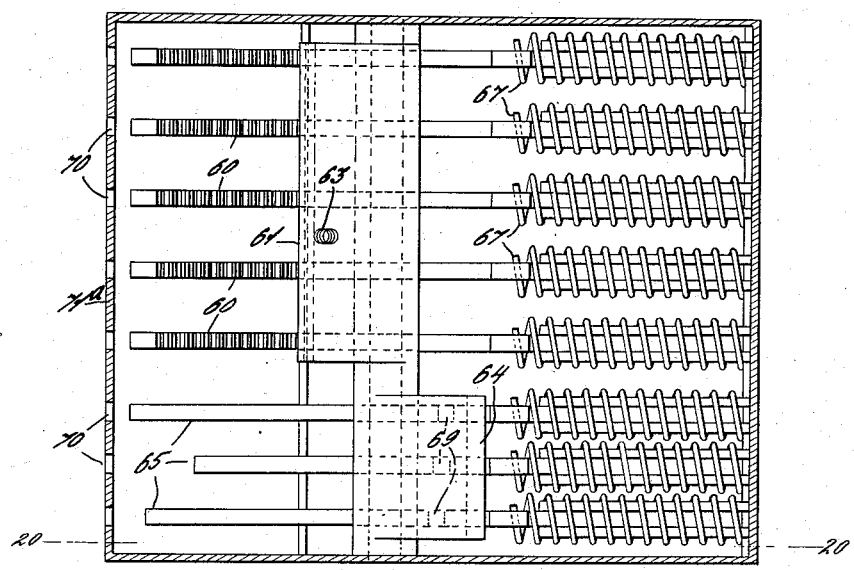
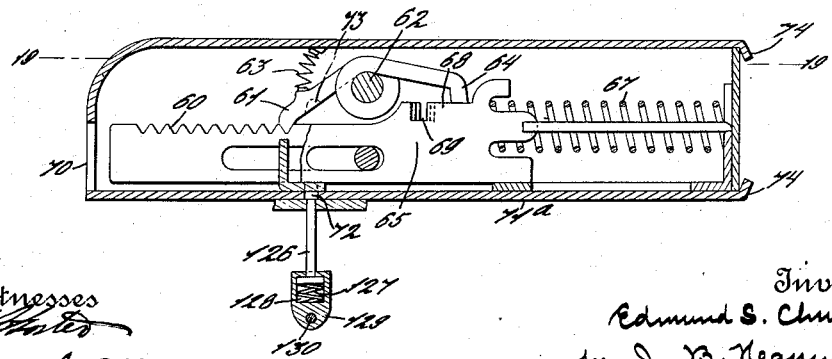

UNITED STATES PATENT OFFICE.

EDMUND S. CHURCH, OF DAYTON, OHIO, ASSIGNOR TO THE NATIONAL CASH REGISTER COMPANY, OF DAYTON, OHIO, A CORPORATION OF OHIO, (INCORPORATED IN 1906.)

CASH AND CREDIT REGISTER.

1,136,101.  Specification of Letters Patent.  Patented Apr. 20, 1915.

Application filed October 11, 1906, Serial No. 338,502.  Renewed September 14, 1914.  Serial No. 861,699.

*To all whom it may concern:*

Be it known that I, EDMUND S. CHURCH, a citizen of the United States, residing at Dayton, in the county of Montgomery and State of Ohio, have invented certain new and useful Improvements in Cash and Credit Registers, of which I declare the following to be a full, clear and exact description.

Many commercial establishments are at present using mechanical devices to assist in auditing and keeping track of the various transactions of the business. One of the most successful systems involves the use of a registering mechanism having means for adding and listing the transactions in succession and thereby providing at the end of a business period a complete list of sales made as well as the total of the value of the sales. Many establishments employ what is termed a multiple counter register, meaning thereby one having instead of a single totalizing device from five to ten counters enabling thereby a segregated analysis of transactions to be retained in the machine. Such a mechanism provides for adding separately the sales of each clerk or department or both and at the same time for listing each separate sale together with a record of the salesman who made it or the department to the credit of which it should be placed. Such a system is satisfactory, provided only a very limited number of separate summations are desired, but it is very difficult to provide a machine having more than a very moderate number of such registers. In one type of registering machine now on the market the separate counters or registers are mounted on a rotatable carrier so that any one of them may be thrown into operative relation with a series of operating racks. This machine however is open to the criticism that only one counter may be used at a time and if it is desired for example to add the sales made by each clerk and the sales made by each department the machine is not capable of accomplishing this. This invention aims to greatly increase the capacity of such machines so much so in fact that any desired number of registering or total retaining devices may be employed. In many commercial establishments the problem of keeping track of credit transactions presents difficulties, and various systems have been proposed for preventing loss in this class of business transactions. It is of course possible to use a cash register having a charge counter on which the amount of credit sales may be entered but this does not serve to indicate which customer should be debited with an amount, nor does it when a payment on account is made serve to designate the customer who should be credited therewith. It has also been proposed to provide a cabinet having many small drawers therein one for each credit customer and to insert in said drawers a slip bearing the record of the amount of any credit sale. This system presents some advantages but is open to the charge that all additions of amounts must be made mentally and also that the slips may easily be lost. This invention aims to improve credit systems by providing a machine which may employ a total retaining device for each customer.

Among the objects of the present invention therefore may be said to be to provide a machine with any desired number of total retaining devices which may be distributed among the clerks, departments, and credit customers. Each clerk will therefore have his own device which he may if desired carry with him; each department no matter how many there are will have its own total retaining device and so will each credit customer.

A further object is to provide with such a machine a mechanism whereby the total from any retaining device may be read at any time.

Another object is to provide a total retaining device for each customer whereby the total of the account is always retained therein, said total being obtainable without resetting the device at any time.

Another object is to improve the construction of adding and subtracting machines by providing mechanism whereby if a payment on account is made by a customer or if money is paid out by a clerk the amount thereof may be subtracted from the proper total retaining device instead of added thereto. This feature of this invention is not limited to use with the particular total retaining device above referred to but may be used in the ordinary type of adding machine with equally good results.

This invention in its broader aspects serves greatly to enlarge the field of usefulness of the usual cash register. At the present time the use of these machines is practically limited to stores of one kind or another but the mechanism described herein may be used not only in stores but in many other kinds of business among which may be mentioned merely building and loan associations, in which case a total retaining device would be provided for each borrower. The total retaining device would be set to the amount of the loan and then whenever a payment was made the amount thereof would be subtracted from the amount already thereon. It is clear that this would at any time give the exact present total of the indebtedness without calculation.

The machine may also be used in keeping a continuous inventory of stock of any kind. In such use one total retaining device would be provided for each article kept in stock. When the stock of any particular article was increased, the number so added would also be added on the particular retaining device and when requisitions on the stock were filled the number of articles so taken away would be subtracted therefrom.

Only a few of many possible applications of the machine are thus referred to but it will be clear that the machine may have a very extensive use.

With these and incidental objects in view, the invention consists in certain novel features of construction and combination of parts, the essential elements of which are set forth in appended claims and a preferred form of embodiment of which is hereinafter specifically described with reference to the drawings which accompany and form part of this specification.

Of said drawings: Figure 1 is a perspective view of the machine. Fig. 2 is an elevation of the right hand end of the machine. Fig. 3 is a transverse vertical section through the machine showing the general operation thereof. Fig. 4 is a vertical transverse section showing the present improvements applied to the machine. Fig. 5 is a detail of parts shown in Fig. 4. Fig. 6 is a horizontal section on line 6—6 of Fig. 4. Fig. 7 is a vertical section on line 7—7 of Fig. 4. Fig. 8 is a detail of part of the transfer device. Fig. 9 is a detail view of a counter wheel showing the zero stop. Fig. 10 is a horizontal section on line 10—10 of Fig. 4. Fig. 11 is a detail view of a trip pawl for the transfer. Fig. 12 is a detail of the identifying devices. Fig. 13 is a section showing the printer operating devices, and mechanism for controlling the total retaining device. Fig. 14 is a vertical section of parts shown in Fig. 13. Fig. 15 is a vertical transverse section showing a bank of special keys and mechanism operated thereby. Fig. 16 is a detail of parts shown in Fig. 15. Fig. 17 is a section on nearly the line of Fig. 15 and also showing the bank of special keys. Fig. 18 is a detail of the record carrying table moving devices, and Figs. 19 and 20 show the total retaining device, Fig. 19 being a horizontal section on line 19—19 of Fig. 20 and Fig. 20 being a vertical section on line 20—20 of Fig. 19.

The machine to which the invention is shown as applied is a well known type now on the market but it is to be understood at the outset that the invention is not limited to use with this type of machine but may in fact be used with many other varieties of adding and listing machine.

As above stated the invention contemplates the use of any desired number of what may be termed total retaining devices which are separate and detachable from the machine and which have therein denominational elements for retaining the various entries in the machine and identifying elements for entering in the machine at each transaction a record of the particular retaining device employed.

In the machine is provided a plurality of printing devices one for each of the denominational elements of the retaining device and also for each of the identifying elements thereof. These printing devices are adapted to be controlled in their movement at the outset of the operation by the denominational and identifying elements of the total retaining devices and when the said printing devices have been so moved a register is connected thereto and the printing devices then reset which resetting evidently serves to move the registering device to an amount equal to that previously in the retaining device. The amount of the transaction is now added to or subtracted from the registering device by a novel mechanism and at the conclusion of this part of the operation the register is again connected to the printing devices and returned to normal position thereby again adjusting the denominational elements of the total retaining device, but the adjustment now includes the last item. When the register has been so returned to normal position the printing devices have been adjusted to the new position of the denominational elements of the total retaining device and an impression is then taken on a record material from the said printing devices. When desired two impressions, one on a strip and one on a check or slip may be taken. If at any time the standing of an account is desired the total retaining device therefor may be inserted in the machine and the amount thereof printed without permanently restoring the denominational elements to normal position. To provide for credit transactions a slidable table is used on which a slip may be placed and the table drawn into the machine in position for the printing devices to make an impression on the slip. For other kinds of transactions the ordinary cash register check is or may be used. The record on the detail strip is intended to include the clerk's or customer's number determined by the identifying elements, the amount of the present transaction, the total standing of the account and any desired information such for example as the date and consecutive number of the transaction.

As above stated the invention is shown as applied to a well known type of machine which is described fully in the patent to Cleal and Reinhard 580,378, April 13, 1897.

For a full description of the mechanism reference is made to this patent but it may be generally stated as follows, reference being made to Figs. 2 and 3. Groups of amount keys 21 serve to control the movement of segments 22 through latches 23 carried by said segments. The segments are mounted on a main shaft 24 which shaft carries tightly thereon a plurality of segments 25 one beside each segment 22. A latch 23 is pivoted at 26 on each of the segments and is bell cranked in form at one extremity having a by-pass pawl 27 and at the other extremity being pivoted at 28 to a slide 29 carried in flanges 30 of the segment 22. The slide 29 has a notch 31 at the rear end thereof adapted to be engaged by the projection 32 on each of the segments 25. The keys when depressed are in the path of the by-pass pawl 27. The shaft 24 is oscillated through about 90° at each operation by an arm 33 connected to a link 34, this link being operated by an arm 35 on a main operating shaft 36 which is given a complete rotation in the direction of the arrow at each operation. The shaft 36 is shown in Fig. 2 and from said figure it will be seen that also rigid with the shaft is a gear 37 meshing with a gear 38 in turn driven by a large gear 39. The gear 38 is rigidly mounted on a shaft 40 which is also one of the operating shafts of the machine. The large gear 39 however is mounted on a stub shaft 41 and gears with a pinion 42 on a stub shaft 43. This pinion 42 is driven by the main handle 44 which is given two complete rotations at each operation of the machine.

The gears 37 and 38 have twice the number of teeth of gear 42 and are thereby given one complete rotation at each operation. When the arm 35 on Fig. 3 is rotated the segments 25 are oscillated until the projection 32 is under notch 31 of slide 29. The slide is immediately pressed rearward by a spring thereby slightly rocking the bell crank 23. When the segment 25 again moves upward it will carry slide 29 with it by connecting the notch 31 and projection 32 and thus moving the segment 22 until the pawl 27 abuts the end of the depressed key. The continued motion of segment 25 serves to rock the bell crank as pawl 27 is stopped by the key to disconnect the slide 29 from segment 25. The forward movement of slide 29 serves to move a projection 45 thereof into one of a series of depressions 46 on the key frame thereby locking the slide 29 and segment 22 in a position depending on the key depressed. The segments 22 are each connected to intermediate gears 47 which are in turn connected to gears 48 on indicators 49. The gears 47 are rigidly mounted on a series of nested sleeves 50 which run through to the left hand end of the machine and are there provided with pinions. It will be clear that the indicators 49 and the pinions on the outer end of nested sleeves 50 move continuously with segments 22, so that in the normal operation of the machine the indicators and sleeves which have been set are first returned to normal position as above described and then reset in accordance with the new transaction.

*Total retaining devices.*—The total retaining devices are shown in detail in Figs. 19 and 20 from which it will be seen that each total retaining device is provided with a plurality of denominational elements here shown as rack slides 60. These slides are normally locked in position by a latch 61 pivoted on rod 62 and spring pressed to latching position by a spring 63. The rear end of the latch 61 as indicated at 64 rests on an elevated portion 68 of three indentifying slides 65 which slides are shown as of different lengths in Fig. 19. Springs 67 are provided one for each denominational and for each identifying element and serve to normally position same to the left in these figures. It will be clear that the five denominational slides are positively locked and that to unlock them the identifying slides must be moved rearwardly until the elevated portions 68 thereof are carried under the rear end 64 of the latch. A depression 69 is provided in each identifying slide and when these are all in line under the end 64 of the latch the said latch may then be raised to release the denominational slides. It will be noted however that the depressions 69 are not in straight lateral alinement but are set at different distances from the end 64. This is for the purpose of preventing manipulation of the device by inserting elements to move the identifying slides under end 64 of the latch. It will be clear that it is practically impossible to so move the elements 65 that all three would be under the rear end of the latch at the same time, but mechanism is provided in the machine for readily accomplishing this purpose. Apertures 70 one for each slide are provided in one end of the device and these are the only openings in the casing 71ª except a small hole 72 in the bottom thereof through which the releasing device is adapted to move. The casing is solid except for these few small apertures and it is to be noted that even if slides 65 are moved so that the depressions 69 are all under the rear end of the latch that the latch is still spring pressed and serves to prevent movement of the denominational slides until a rod is inserted through the aperture 72 far enough to engage a depression 73 in the latch 61 and raise the same. At the end of the total retaining device distant from the aperture 70 are provided projections 74 for holding a plate bearing the clerk's or customer's number or any other identifying information.

*Controlling mechanism.*—The mechanism for adjusting the total retaining devices is best shown in Fig. 4. At the right of this figure a retaining device is shown broken away and entered in the machine. In front of the apertures 70 of the retaining device are a series of slides 71 guided at their forward ends by pins 72a engaging slots 73a in said slides. At their rear ends the slides pass through the actuating bar 74a which is part of a frame including arms 75. On each side of the arm 74a are springs 75a and 76 for each slide 71, serving to retain the slide in the middle position. Each slide 71 is provided with a slot 78 in which rides a pin 79 on a printing segment 80. The segments 80 there being one for each slide 71 are each provided with rack teeth 81 adapted to engage with register wheels 82 when the same are depressed. The frame including arms 74a and 75 is adapted to be reciprocated forwardly and reversely twice at each operation of the machine this being accomplished by a cam groove 83 in a disk 84 mounted rigidly on and rotated by a shaft 85. The frame has an anti-friction roller 86 engaging the cam groove 83 and it will be seen from the shape of the groove that the frame will be moved first forwardly and then reversely twice at each operation. This movement evidently tends to move all the slides 71 in the same manner. A flash 86 is normally in front of the slide 71 being held in such position against tension of a spring 87 connected to an arm 88 which carries the flash, by a cam 89 also carried by shaft 85. This cam 89 engages the anti-friction roller 90 on the rear end of arm 88 in the normal position of the mechanism but when shaft 85 is rotated cam 89 is carried from over roller 90 and the flash can then move out of the path of slides 71. These slides then come forward until stopped by the denominational elements of the total retaining device thereby setting up on the printing segments 80 the amount of the entry on said retaining device and also adjusting the racks 81 to the same extent.

Printing segments 80 and controlling slides therefor are also provided for the identifying elements 65 of the total retaining device but it will be remembered that the identifying elements are not locked against movement so that when the slides 71 therefor are moved forwardly they serve to push the slides 65 against the tension of their springs 67 until the depressions 69 are nearly under the rear end 64 of latch 61. As above stated however the depressions 69 are not in line and mechanism is therefor necessary to bring them into set line before the latch 61 may be released. This mechanism is shown in Figs. 12 and 13 and it will be seen that in Fig. 12 the clerks' printing devices 80 are set in slightly different positions it being assumed in this figure that the slides 71 have moved forwardly and have thereby moved the identifying slides 65 as far as possible. The alining pawl 100 is pivoted on a shaft 101 and also on this shaft is an arm 102 adapted to be operated by a cam 103 on a disk 104 carried by and rotated with shaft 85. The arm 102 is pressed by a spring 105 to withdraw the alining arm 100 from the rack teeth 81. When the shaft 85 is rotated and all the slides 71 thrown forwardly the cam 103 serves to raise arm 102 thereby lowering arm 100 and serving to aline the identifying printing devices and to force the slides 65 of the total retaining device directly under the rear end 64 of the latch 61. The denominational slides 60 are however still latched and are not unlatched until the arm 61 is positively raised.

*Registering mechanism.*—The main operating shaft 36 previously referred to carries as shown in Fig. 4 a cam disk 106 having a cam groove 107 therein. Adapted to ride in this cam groove is an anti-friction roller 108 carried by the bell crank lever 109 pivoted at 110 the forward arm of which carries a rod 111 on which are mounted the register pinions 82. These register pinions have no numbers thereon though they might have, and consist merely of accumulating gears provided with transfer pins 112. When the machine is operated shafts 85 and 36 are rotated and the rotation of the first mentioned sets the racks 81 to a position depending on the position of the denominational slides 60 but the register 82 is not moved at this time. When the portion 83a of cam groove 83 reaches the roller 86 it will be clear that the frame arms 74a and 75 will be returned to the position shown in the figure. This will also cause the return of printing segments 80 and racks 81 to normal position but at this time the roller 108 has moved upwardly as will be seen from the shape of cam groove 107, and the register pinions 82 have thereby been depressed into mesh with racks 81. It will be clear that the return of racks 81 to normal position will add on register 82 the amount previously indicated by the denominational slides 60. It will readily be seen that the purpose of springs 76 and 75a is to provide a flexible connection between arm 74a and the slides 71 so that the arm 74a may be given a full stroke in either direction without necessarily moving the slides 71. It should be noted that the frame arms 75 are supported by shaft 85 as indicated by the elongated slot 120, this arm being supported at its forward end by the frame piece 121.

To release the denominational slides 60 mechanism shown in Figs. 4, 13 and 20 is employed, this mechanism serving to raise the arm 126, which elevates the latch 61. The arm 126 is yieldingly supported by the spring 127 carried in an aperture 128 of a piece 129. The piece 129 is provided with a pin 130 which engages a slot in an arm 131 pivoted at 132 and normally drawn downward by a spring 133. To shaft 132 is fast an arm 137 carrying a pin 135 which rides in a slot 136 in a vertically movable bar 137. This bar is supported on the machine frame by headed pins 138 riding in a slot 136 and an additional slot 136$^a$. Connected to the slide 137 by the pin 139 mounted thereon is a lever 140 pivoted on a pin 141 and at its rear end straddling loosely the shaft 85. A vertical projection 142 of this lever 140 is provided with an anti-friction roller 143 riding in a cam groove 144 cut in disk 104 which as previously stated is rotated by shaft 85. It will be seen from the shape of the groove 144 that when the portion 144$^a$ thereof reaches the roller 143, the lever 140 will be rocked, thereby lowering the bar 137 and raising the arm 126 until it abuts and raises the latch 61 to release the denominational slides 60. This release however does not occur until the printing segments 80 have been set and have been returned to normal position in mesh with counter pinions 82. When the denominational slides 60 are released as described they immediately move under tension of their spring 67 to position shown in Fig. 19 which is the zero position of the device.

*Register operating mechanism.*—It is next necessary to enter on the registering device the new transaction. As before stated the nested sleeves 50 on Fig. 3 are moved in accordance with the amount of the sale or other transaction and in so moving serve to adjust, first, reversely to normal position and then forwardly to the desired position a series of pinions mounted on said nested sleeves. These pinions are indicated by numeral 151 on Fig. 6 and all except the one on the innermost sleeve mesh with pinions 152 also mounted on nested sleeves 153. On the other end of said sleeves 153 is a second series of pinions 154 meshing with a series of gears 155, the gears 154 and 155 being also shown on Fig. 4. The object in using the additional set of nested sleeves and pinions is to procure a reversal of the order of pinions 155 as compared with pinions 151. In the machine the banks of keys and the segments 22 are in ascending denominational order from right to left so that the pinions 151 are in reverse order. It is however desirable that pinions 155 should have the same arrangement as the segments 22 and this is accomplished by the pinions 152 and 154 on the nested sleeves 153. It will be easily seen that the pinion 151 of lowest denomination does not need a pinion 152 or sleeve 153.

The pinions 155 are each adapted to mesh with two horizontal rack bars one above the pinion indicated by 156 and one below the pinion marked 157. These rack bars extend forward and each have a rack on the lower side thereof at 158 adapted to mesh separately with the register pinions 82. The racks are all supported at their forward ends by the rod 159 which is laterally shiftable at will. It will be clear that the movement of racks 156 is in a direction opposite to the movement of racks 157 and that to determine whether an amount shall be added to the register 82 or subtracted therefrom it is only necessary to provide means for causing either set of racks to mesh with the register at will. The mechanism is normally so adjusted that the adding racks 156 are directly over the register pinions 82 so that the amount entered in the machine is added to register 82 and when it is desired to subtract, the amount racks are shifted by the lateral movement of rod 159 to bring the subtracting racks 157 over the pinions 82. As previously stated the segments 22 and devices operated thereby remain in set position between operations of the machine and at any operation are restored to normal position and then are readjusted to their new position. This clearly also applies to racks 156 and 157 though they are shown in Fig. 4 as in normal or zero position. It will be clear that the register pinions 82 must be dropped out of mesh with the racks 157 before such restoration of the racks to normal takes place and that the register pinions must be again placed in mesh with the racks before the racks are readjusted to their new positions. When the racks are so adjusted the register pinions 82 are also moved and it being remembered that the pinions 82 have been previously set by the racks 81 to an amount depending on the position of denominational slides 60 and equal to the total amount on the total retaining device, it will be seen that the register pinions 82 are now set to the total including the new transaction. Broadly speaking therefore if the register pinions 82 are now depressed into mesh with segments 81 and the slides 71 thrown forwardly the register 82 will be restored to zero and when so restored will stop the slides 71 in a position depending on the total amount which the register had indicated. The forward movement of slides 71 will evidently serve to move the denominational slides 60 of the total retaining device and will thereby set such slides to a position indicating the total of the amount previously on the slides added to the amount of the new transaction.

*Transfer devices.*—It is to be noted however that as two amounts have been added on the register a transfer may be necessitated. Inasmuch as racks 156 and 157 are positively connected together through pinions 155, it will clearly be necessary to provide only one set of transfer devices and it is to be noted that this one set provides for a transfer in either an adding or a subtracting direction. The mechanism shown is adapted to move the racks an additional step and in this embodiment the transfer device is in position to engage the adding racks 156. Directly over racks 156 are bars 161 connected at their rear ends to levers 162 pivoted on a rod 163 and carrying at their lower ends anti-friction rollers 164. These rollers are adapted to be engaged successively in the usual manner by cams 165 rotated with shaft 36 so that the bars 161 are given a forward movement at each operation of the machine and are returned to normal position by springs 166 connecting a frame rod 167 with hooks 168 carried by the said bars 161. Each bar also carries at its forward end a transfer pawl 169 normally held up by pins 170 mounted thereon which rest on trip pawls 171 carried loosely by the rod 159. These trip pawls of which one is shown separately in Fig. 11 have depending projections 172 in the path of pins 112 on the register pinions 82. It will be clear that as the register pinion is rotated in either direction its pin will strike the trip pawl 171 and rock the same against the tension of a leaf spring 172$^a$ carried by each pawl tending to return the same to vertical position from either direction. When the trip pawl 171 is so rocked the transfer pawls 169 drop, being moved by springs 173 into the teeth of the ratchet 174 of which there is one on each adding bar 156. When the shaft 36 is further rotated cams 165 strike the rollers 164 and push forward the bars 161 thereby also moving the racks 156 and 157 an additional step. It will be seen that no matter whether the adding rack 156 or the subtracting rack 157 is in gear with the register pinion 82 the additional step of movement of the rack will cause the proper additional step movement of the register. If racks 156 are in gear with the register it will be easily seen that the additional forward step thereof will cause the proper transfer movement of the register whereas if racks 157 which are subtracting racks are in gear with the register pinions the additional movement of racks 156 will cause an additional movement of racks 157 which will reversely rotate the register pinion 82 for a subtracting transfer. It is of course necessary in view of the fact that transferring movement is to be given to pinions 155 by racks 156 that a loose connection be provided between the pinions 155 and their operating devices. This is illustrated in Fig. 8 where the pinion 155 is shown as connected to the operating devices. It will be seen that to give a transferring movement merely tensions spring 179 and that this spring serves to retract the operating racks their additional step as soon as the transfer pawls 169 are raised.

*Subtracting mechanism.*—It remains to be explained how the racks are shifted laterally to cause either set to mesh with the register pinions. This is best shown in Fig. 7 and as will be seen the register pinions 82 are normally directly under the adding racks 156 and out of relation with the subtracting racks 157. It will be remembered that the racks are all carried by rod 159 and this is given a lateral movement by bevels 182 carried on the shaft and 183 carried at the top of a curved arm 184 shown on Fig. 15. This curved arm 184 is carried by headed pins 185 moving in slots in the bar and is also provided with three cam slots 186 and two straight slots 187 in which are adapted to move pins 189 carried by each of the special keys. As shown on both of these figures (Figs. 7 and 15) are provided five special keys which reading from top to bottom bear checks reading respectively "Void," "Bill," "Received on Account," "Charge," "Paid Out." The "Void" key is intended to be used when goods are returned for any reason, the "Bill" key is used when the customer desires a statement of account or when the proprietor wishes to learn the amount of any total retaining device, "Received on Account" key is used when a customer pays in money on account, the "Charge" key when amount is to be charged to a customer and the "Paid Out" key will be used when money is paid from the cash drawer by a clerk. Of these keys it is clearly necessary that the "Void" key, "Received on Account" key and the "Paid Out" key should cause a subtraction of the amount from the register, whereas the "Charge" key is desired to cause an addition of the amount. This is evidently accomplished by the cam slots 186 for the "Void," "Received on Account" and "Paid Out" keys as it will be seen that the depression of any one of the three said keys will raise the curved bar 184 thereby causing the bevel 183 to engage bevel 182 and so slide the rod 159 laterally to an extent sufficient to bring the subtracting racks 157 over register pinions 82 and to withdraw the adding racks from over said pinions. It will be seen on this figure that the transfer pawls 169 are wide enough to engage the adding racks 156 in either position. A spring 190 extends between the frame piece and a collar 191 on a rod 159 and serves to return it to the position shown in Fig. 7 to engage the adding racks with the register.

*Printing mechanism.*—It was previously stated that the register pinions 82 first have the amount indicated by the denominational slides 60 of the total retaining device added thereto and then are readjusted in accordance with the new transaction by the adding or subtracting racks and the transfer mechanism. Following this slides 71 are again thrown forwardly this time with segments 81 in gear with register pinions 82 until the said pinions are returned to normal position. It will be clear that at this time the printing segments 80 are set to the total of the previous amount on the total retaining device and the amount of the present transaction. It is now desired to print the total amount and mechanism for so doing will be next described, referring particularly to Figs. 4 and 13.

The machine is constructed to print at each operation on a detail strip which is retained in the machine and on a check which is fed out of the machine or an inserted slip. The detail strip 200 is carried on a roller 201 from whence it is led from pins 202 and 203 to a winding roller 204. This roller has a gear 205 with the teeth of which engages the driving pawl 206 pivoted to an arm 207 which is carried on a shaft 208 also supporting the winding roller 204. A spring 209 connects the pawl 206 to the arm 207. Also connected to arm 207 is a link 210 which as shown in Fig. 13 has a slot 211 in the rear end thereof. The main shaft 24 which was previously stated to be oscillated at each operation carries an arm 212 having a pin 213 riding in said slot 211. It will be seen that when the shaft 24 is oscillated the pin 213 will move through slot 211 and that when it reaches the rear end of the slot the further motion of the pin will move the link 210 and draw pawl 206 rearwardly to rotate the winding roller 204 sufficiently to feed the strip. When the shaft 24 returns to normal position the last increment of motion thereof will carry link 210 forward whereupon the end of the pawl 206 rides idly over the succeeding tooth of the gear 205. The extent of this feed can clearly be regulated by changing the length of the slot 211. The gear 205 meshes with the second gear 213 carrying a roller 214 for feeding an ink ribbon 215 which passes around this roller and over a series of rollers 216 so that the ink ribbon is also fed slightly at each operation.

The check strip 220 is carried by a roller 221 and passes downwardly through a pivoted chute 222 from whence it passes between printing and feeding rollers 223 and 224 and over a knife blade 225 to the printing point. The check instead of being ejected at the front of the machine is adapted to be issued at the side thereof and to this end I provide a carrying table shown in Figs. 1, 4 and 10. The table is normally withdrawn from the machine as indicated in Fig. 1 but is adapted to be drawn into the machine at each operation, and when so drawn in it provides a support for the check strip 220 as it is fed forwardly. The slot 226 in the table serves to allow the feed of the check strip. The feeding and printing roller 224 has any desired matter thereon for printing on the check such for example as an advertisement of the proprietor, means for printing a consecutive number and the date. A small roller 227 is provided which may carry any matter desired to be changed frequently such for example as "Your Bill is Due" or any other desired matter. These rollers 223 and 224 are given a complete rotation at each operation of the machine being connected through a gear train shown in Fig. 15 to a gear on shaft 36.

An ink roller 228 is supported on arms fastened to the pivoted check carrying frame 222 so that when no check is to be issued the chute may be rocked rearwardly so that the type on roller 224 will not be unnecessarily gummed with ink. It is desired that when a charge transaction is to be entered in the machine and on a total retaining device a slip be used instead of the check. In this case it is desired to throw off or discontinue the check feed and this is provided for as shown in Figs. 4 and 15 by an arm 231 connected at its rear end to an arm 232 which serves to oscillate the eccentric sleeve 233 which carries the roller 223. This arm 231 is supported at its forward end by a pin 234 passing through a slot in said arm and is returned to normal position by a spring 235 connecting said pin 234 to a pin on the arm 231. The forward end of arm 231 is curved as shown at 232 so as to be in the path of pin 189 of the charge key. It will be evident that when the charge key is depressed the eccentric sleeve 233 will be rocked enough to carry roller 223 away from roller 224 so that although the rollers are rotated by the operation of the machine no feed of the check takes place. As above stated the check table 240 is adapted to be injected into the machine at each operation, but if a charge transaction is to be entered the table must be pushed in by hand before the machine is released as will be described. The check table 240 is supported by arms 241 sliding on horizontal rods 242. As shown in Fig. 18 one of these rods is provided with a sleeve 243 movable with the arm 241 and carrying a pin 244 against which abuts the lever 245 pivoted on a pin 246 and having at its rear upper end an anti-friction roller 247 moving in a cam groove 248 in a cylinder 249 carried by a shaft 250 which is given a complete operation at each rotation of the machine through a gear 251 carried thereby meshing with a gear 252 on the main shaft 36. A spring 253 connected to the main frame and to a pin on sleeve 243 tends to return the check table to its outward position and a latch 254 pivoted on a pin 255 and pressed by a spring 256 against a pin 257 is adapted to engage pin 244 on a sleeve 243 when the check table has been moved into the machine. From this description it will be evident that the check table may be moved manually into the machine carrying pin 244 into a position where it is latched by pin 254. During the operation of the machine, lever 245 is rocked by the cylinder 249 far enough to force the latch 254 back releasing pin 244 so that when the lever 245 returns to the position of Fig. 18 the table will also move outwardly under tension of spring 253. If however no slip is to be used but a check is desired the operation of the machine will rock lever 245 and force the check table into the machine in position to receive the check and to carry the check laterally out of the machine.

To print a record from the segments 80 the mechanism shown in Figs. 4 and 5 and 13 is employed. It will be remembered that the table 240 is drawn into the machine at each operation and the check fed thereover. An impression is desired on the check and after the impression has been made and the table moved outwardly the impression on the strip is desired. To accomplish this impression taking a platen and a means for impressing it against type segments twice at each operation are provided.

Referring first to Fig. 13 it will be seen that main shaft 36 carries a cam 260 adapted to raise an anti-friction roller 261 on a link 262 which straddles the shaft 36 and which is connected at its lower end to a platen arm 263 carrying a platen 264. This arm is pivoted at 265 and is normally spring drawn in a direction to force the platen against type segments 80 by the spring 266. Also pivoted at 265 beside the platen arm 263 is a second arm 267 spring drawn in a manner similar to the platen arm by spring 268 and having a pin 269 directly over said platen arm 263. At the forward end of the arm 267 is a projection 268ª which when the forward end of the arm is depressed is adapted to pass under and be held by a latch 269ᵇ pivoted on the pin 270 and having a depending projection 271. Directly in front of the depending projection 271 as shown in Fig. 5 is a lever 272 connected at 273 with a second lever 274, these levers 272 and 274 being pivoted at intermediate points as shown. At one end thereof, lever 274 has a curved part 275 in the path of the pin 276 carried by the check table. When shaft 36 is rotated the cam 260 will raise link 262 thereby depressing the platen 264 and also depressing the projection 268ª and arm 267 until it is latched by latch 269ᵇ. When the high point of cam 260 passes from under roller 261, spring 266 will immediately elevate the platen 264 and force it against the type segments 80 thereby making an impression on the check or slip whichever is used. When the slip table is forced outwardly by spring 253 the pin 276 carried by the sleeve 243 will engage the end 275 of the lever 274 and move rearwardly depending projection 271 and latch 270ᵇ. This releases arm 267 which immediately oscillates under tension of its spring 268 and forces a pin 269ª upwardly to strike the lower side of the platen arm 263 so that the said platen arm will again be forced against the type segments 80 this time printing on the detail strip 200.

*Zero stop for register.*—It has been previously stated that the register pinions 82 are reset to zero by the racks 81 for the purpose of determining the final position of the denominational slides 60 of the total retaining device. It is necessary to provide some means for stopping the pinions when they reach their normal position and this mechanism will now be described, referring to Figs. 7 and 9. It will be remembered that the rod 111 carrying register pinions 82 is raised and lowered twice at each operation, to bring the pinions into mesh with the segment gears 81. The rod 111 supporting the register pinions is slit longitudinally and two oppositely beveled bars 301 and 302 are inserted in the longitudinal slit.

Bar 301 is fast to the rod 111 but bar 302 is loose therein and extends beyond the register pinions having at its extreme end an anti-friction roller 303 which rides in an oblique slot 304 in a bracket 305. In the upper position of rod 111 the bar 302 is as shown in Figs. 7 and 9 forced to the right completely filling up the slit in the bar 111. When however the register pinions are depressed the roller 303 rides down the cam slot 304 forcing the beveled bar 302 to the left and thereby allowing the lower edge of said bar to rise slightly. Each register pinion 82 is provided with a zero setting pawl 306 pivoted thereto on a pin 307 and pressed by the spring 308 around the axis of the pinion. In the upper position of the rod 111 the pawl 306 may ride past the point in which it is shown in Fig. 9, but when the register pinions are lowered and beveled bar 302 raised relative thereto the said bar moves back within the slit in bar 111 thereby furnishing a positive stop for the pawls 306 and so setting the pinions 82 positively at zero position. As at this time the pinions 82 are in gear with segments 81 the segments are positively stopped in a position dependent on the amount which the register pinions had been moved from normal position.

A collar 309 is shown as around rod 111 but this is a part of the register pinion which is counter sunk to provide a place for the zero pawl 306. This collar 309 does not therefore impede the movement of pawl 306. It will be remembered that pinions 82 are depressed in the first part of the operation to engage segments 81 but at this time the segments invariably move the register pinions forward and the beveled bars 301 and 302 offer no obstruction to this movement.

*Locking devices.*—It is desirable that mechanism should be provided preventing an operation of the machine until one of the total retaining devices has been injected therein. It is also desirable that when the retaining device has been so inserted it should be locked in position until the end of the operation. Referring to Fig. 4 it will be seen that the total retaining device has on the top thereof a cam 311 having a notch 312. When the retaining device is pushed into the machine the cam 311 rides under and elevates the arm 313 on a shaft 314, said arm 313 having a projection 316 which finally drops into the notch 312 of the cam 311. On shaft 314 is shown in Fig. 15 a second arm 315 having a pin and slot connection 317 with a curved bar 318. This bar is carried by headed pins 319 and 320 passing through a slot 321 in said bar and has at its upper end a spring connecting a pin thereon to a pin on the main frame and tending to raise the bar 318 to the position shown in the figure. A projection 322 of bar 318 normally rests against an arm of a bell crank lever 323 pivoted to a stub shaft 324 and carrying a pawl 325. The pawl is pivoted at 326 to the arm 323 and is normally drawn by a spring 327 connected to arm 323 so that a pin on the said arm 323 is against the edge of a cut away portion of the pawl. Just below the pawl the arm 323 is cut away at 328 and the pawl as shown projects slightly over the cut away part. As shown in Fig. 2 the stub shaft 324 supports the other arm of the bell crank lever 323 which has projecting therefrom a lug 329 normally in front of a lug 330 on the gear 38. The bell crank 323 is curved at its rearward end and has connected thereto a spring 331 fastened to the main frame. Carried by gear 37 is an antifriction roller 332. It will be clear that normally the projection 329 of bell crank 323 prevents movement of the operating mechanism. When the total retaining device is inserted the cam 311 carried thereby moves under arm 313 and raises the same thereby depressing the arm 315 and so carrying down the curved bar 318, the upper end 322, which is moved far enough to pass the point of pawl 325. When the notch 312 reaches the projection 316 of the arm 313 the said arm may drop slightly thereby allowing the curved bar 318 to rise slightly when the projection 322 rocks the pawl 325 to entirely uncover the cut away portion 328 of the arm 323. When this is done the spring 331 may rock the bell crank 323 and withdraw the projection 329 from in front of projection 330 thereby unlocking the machine. It will be seen that it is not merely the pushing in of the total retaining device which unlocks the machine but it is the carrying of projection 322 of curved bar 318 past the cut away part 328 and then allowing it to rise again which unlocks the machine. A mere implement inserted in the aperture where the retaining device is put would not serve to operate arm 313 in such a way as to release the mechanism.

As shown in Fig. 10 the total retaining device has a struck up lug 336 on the side thereof and when the device is completely entered in the machine the lug 336 passes behind the bar 337 carried by an arm 338. This arm as shown in Figs. 13 and 14 has a projection 339 at its rear end directly over a bevel 340 on the vertical bar 137 previously referred to. It will be remembered that lever 140 is rocked to raise the plunger 126 and to release the same, near the end of the operation. It is also adapted to move the bar 137 upwardly beyond its normal position afterward, as will be seen from the part of the cam groove 144 marked 144ᵇ and this is used to release the total retaining devices. When bar 137 moves upward its bevel 340 moves under the end 339 of arm 338 thereby carrying the same laterally enough to withdraw the pin 337 from in front of lug 336 of the total retaining device. A plunger 341 is shown on Fig. 4 pressed by a spring 342 outwardly so that when the total retaining device is released the plunger 341 will move outwardly and eject the total retaining device on to the curved table shown on Fig. 1. It is however necessary that arm 313 should be raised to carry projection 316 away from notch 312 at this time as this will also serve to hold the retaining device. It will be seen that as gear 37 shown on Fig. 2 rotates, the roller 332 carried thereby will raise the rear arm of bell crank 323 to carry projection 329 again in front of projection 330, and the roller 332 is so positioned that the arm 323 is raised farther than the position in which it is shown. This additional movement will evidently rock the forward arm of the bell crank 323 rearwardly past the position in which it is shown in Fig. 15. Carried by the forward arm of bell crank 323 is a curved arm 351 having an anti-friction roller 352 which abuts a curved edge of the bar 318. In the normal position of the mechanism the roller 352 merely touches the bar 318 but when the additional rearward movement of lever 323 is given the roller 352 will force bar 318 downwardly enough to carry the projection 316 on the end of arm 313 away from the notch 312 and will thereby release the total retaining device so that it may be pushed outwardly by plunger 341.

It may occasionally be desired to release and allow the ejection of an inserted total retaining device without an operation of the machine as for example in case a wrong retaining device was inserted. To accomplish this function a projecting releasing lever 353 is provided as shown on Fig. 2 pivoted on a pin 354. A pin 355 mounted on arm 353 moves in a slot of a lever 356 pivoted at 357 and normally drawn by spring 358 connecting the lever to a bracket on a main frame. The upper end of lever 356 is directly over a projection 359 of an arm 360 carried by the stub shaft 324 which also carried bell crank lever 323. When the projecting arm 353 is depressed the bell crank 356 will be rocked against the tension of spring 358 and its upper end engaging the projection 359 of arm 360 will produce precisely the effect produced by the roller 332 on gear 37. That is it will rock bell crank lever 323 past its normal position and so release the total retaining device. A projection 361 on the bell crank lever 356 will when arm 353 is depressed pass into a cut away portion 362 of a disk 363 carried by the gear 39 thereby locking the operating mechanism while the releasing devices are in use. It has been stated that a depression of projecting arm 353 will release the total retaining device but it will be remembered that said device is held by pin 337 as well as by projection 316 of arm 313. It has been described how the arm 313 is released and on reference to Fig. 13 it will be readily seen that when projecting arm 353 is rocked a second arm 353ª also carried by shaft 354 is depressed. This arm 353ª carries an antifriction roller 353ᵇ in a slot 353ᶜ of a bell crank lever 353ᵈ. This lever is pivoted on a pin 353ᶠ and at its upper end has a bevel 353ᵍ in a position such that when the bevel is moved forwardly it engages the rear end 339 of the arm 338 thereby withdrawing pin 337 from in front of lug 336 on the total retaining device. This bevel 353ᵍ is also shown on Fig. 10. It may be noted that a depression of arm 353 will in the patented machine serve to release any depressed key as well as to release the total retaining device but that is no part of the present invention and is not shown herein.

It has been said that the machine is normally locked and is released by the insertion of a total retaining device. In case a charge transaction is to be entered in the machine it is desired to compel the insertion of the slip and check table as a slip is used in connection with this class of transaction, and means are employed for preventing the release of the machine when the charge key is operated even though the proper total retaining device has been inserted until after the table has been moved into the machine, this mechanism being shown in Figs. 15 and 16. The charge key is the second key from the bottom and its pin 189 is adapted when depressed to engage and rock an arm 371 carried on a pin 372 projecting from the main frame, this arm being drawn forward by a spring 373 connecting a pin on arm 371 to a pin on the main frame. As shown in Fig. 16 the pivot 372 projects through a frame bar and surrounding the pin is coiled spring 374 normally forcing the arm 371 but the movement of arm 371 is limited by a pin 375 passing through the pin 372. The arm 371 is directly in front of the lower end 376 of bell crank 323 which it will be remembered is forced forwardly by a spring to release the mechanism. When the charge key is depressed arm 371 will be rocked rearwardly and will abut and restore the bell crank 323 to its normal position. This however will not release the projection 322 as it will still be held by pawl 325. To unlock the machine in this case it is necessary to press in the slip table. The supporting sleeve of said table carries a pin 377 which at the end of its inward travel is in position to engage and shift laterally the arm 371 against the tension of its spring 374. Such lateral shift of arm 371 will evidently carry it from in front of the bell crank 323 which will then move forward under its spring and release the machine.

As shown in Fig. 1 and as previously stated one of the special keys is a "Bill" key. This key will be used when it is desired to print a statement of the amount entered on any retaining device and it produces no effect on the machine except to control a printing device to impress the letter B or some other character on the record. As of course no amount keys should be operated in connection with this "Bill" key an interlock is provided there between. In this type of machine the amount keys 21 as shown in Fig. 17 have a beveled inner end which when the key is depressed engages the bevel portion 381 of a segmental detent 382 journaled loosely on the main shaft 24. It will be clear that the depression of any key will raise the detent 382 and all of the said detents are provided with pins 383 one of which is shown on Fig. 3 connecting the detent to a vertical arm 384 which at its lower end straddles the rod 385. Just forward of the rod 385 a flange 386 is provided on the arm 384 through a hole in which a pin 387 fast to the rod 385 passes. Each bank of amount keys has this mechanism operated thereby so that when any key is operated the rod 385 is rocked through one of the pins 387. The pin 189 of the bill key as shown on Fig. 17 is directly in front of one arm of a lever 388. This lever is pivoted on a pin 389 and at its lower end has a flange 390 through a hole in which a pin 391 fast on rotary rod 385 passes. It will be seen that when the bill key is depressed the rod 385 will be rocked in the direction opposite to that in which it is moved by an amount key, it being noted that the flange 386 and 390 allow some play of the pins 387 and 391. It will be seen that this provides a very simple and at the same time effective interlock between the amount keys and the bill key. If the bill key is depressed the lever 388 is rocked and flange 390 rocks rod 385 thereby carrying the pins 387 downwardly in Fig. 3 to the end of the holes through flange 386. In this position no amount key can be depressed as such depression of an amount key necessarily raises the corresponding arm 384 but this is held locked by its pin 387. If any amount key is pressed the bill key cannot there after be pressed at the same operation of the machine.

*Special drawer.*—The total retaining devices may of course be kept in any desired receptacle but there is shown a special drawer in addition to the cash drawer usually furnished with cash registers for holding the same. This special drawer is shown as partly exposed in Fig. 1 and is also shown in Fig. 3. As was previously stated when any of the special keys are depressed the detent 382 shown on Fig. 17 is raised and this movement is utilized to release the special cash drawer inasmuch as no one of these keys will be pressed except when it is desired to use one of the total retaining devices. Connected to the detent 382 is an arm 392 which when depressed rocks an arm 393 carried by a shaft 394. Also carried by this shaft 394 is an arm 395 on Fig. 3 to which is connected a vertical link 396 having at its lower end a pin and slot connection 397 with a drawer latch 398. The latch is normally in position to hold the special drawer in concealing position through the engagement of the said latch with a lug 399 carried on the rear of the cash drawer. It will readily be seen that when any special key is depressed the link 396 will move downwardly and will carry the latch 398 away from lug 399 against the tension of a restoring spring 400 when a large spring 401 will immediately eject the special cash drawer. Any desired total retaining device may then be taken from the cash drawer and inserted in the machine. When the drawer is pushed inwardly the pin and slot connection 397 between the latch 398 and the vertical bar 396 allows the relatching of the drawer without moving the link 396.

*Proprietor's indicator.*—To provide means whereby the proprietor or some one entrusted therefor may determine the standing of any or all of the retaining devices mechanism shown at the front of the special drawer on Figs. 1 and 3 is provided.

A locked cover plate 411 serves to prevent access to the indicator but when the special drawer is moved to exposing position the plate 411 may be unlocked and raised by the one having the proper key. A plurality of indicator wheels 412 equal in number to the denominational slides of the retaining device are each adapted to exhibit one number thereon through an aperture 413 in a plate 414. Pinions 415 carried by said indicator wheels mesh with vertical rack bars 416 which are connected through levers 417 to other vertical bars 418. Springs 419 tend to return this mechanism to its normal position. When the cover plate 411 has been raised the total retaining device may be pushed downwardly so that the apertures 70 thereof surround the vertical bars 418. As the retaining device is pushed farther the denominational slides 60 will engage and operate arms 418 and thereby rotate the indicators wheels 412 to indicate directly the amount entered on the retaining device. This can be used at any time and causes no entry to be made in the machine.

It is necessary to provide means for restoring the transfer pawls 169 to position over the trip pawls 172 and this mechanism is shown in Fig. 4. Journaled on a rod 401 are frame arms 402 (Fig. 7) connected by a bar 403 over the bars 161 and in position to engage the tails of the transfer pawls. Fig. 4 shows the normal position of the mechanism. When the machine is operated the cam 89 releases flash controlling arm 88 and allows its rear end to move upward. A cam slot 404 is provided in the arm 88 in which rides a pin 405 on one frame arm 402 so that the upward motion of the rear end of arm 88 rocks the frame arms 402 withdrawing bar 403 from the rear ends of the transfer pawls and allowing them to be operated if necessary. Near the end of the operation of the machine the frame bar 403 is again moved forwardly as flash arm 88 returns to its normal position and the said frame bar 403 will engage the rear ends of any transfer pawls which have been tripped and return them to normal position in which they are supported by trip pawls 172.

A check severing mechanism comprising fixed and movable knife blades 4111 and 225 is provided as shown in Fig. 4 and the movable blade 225 is arranged to be operated (see Fig. 13) by a cam projection 4131 on disk 104 which near the end of the operation engages an anti-friction roller 4141 on a bell crank 4151 which has a slot 4161 in which rides a pin 4171 carried by the knife blade 225. It will be clear that near the end of each operation the blade 225 will be raised past blade 4111 and thereby sever the check, allowing it to remain on the table.

The feature of a detachable total retaining device is believed to be broadly new and the claims including the same are designed to have a corresponding scope. Any device capable of retaining an entry of transactions or totals and adapted to control and also be controlled by the operation of the machine for the purpose of providing in the machine an entry of complete transaction is considered to be within the invention.

It is to be noted that although the mechanism has been shown as designed to print a record including the coincident transaction it may be so changed as to print the amount of previous transactions by merely changing the timing of the platen controlling cam and the table moving cam so as to print when the preceding total has been set up at the beginning of the operation.

While the form of mechanism here shown and described is admirably adapted to fulfill the objects primarily stated, it is to be understood that it is not intended to confine the invention to the one form of embodiment herein disclosed, for it is susceptible of embodiment in various forms all coming within the scope of the claims which follow.

What is claimed is as follows:

1. In a machine of the character described, the combination with accounting mechanism, of a total retaining device detachable from the machine but adapted to be inserted therein, and means for adjusting the accounting mechanism to an extent dependent on said total retaining device.

2. In a machine of the character described, the combination with accounting devices, of a total retaining device detachable from the machine but adapted to be inserted therein, means for adjusting the accounting devices to an extent dependent on said retaining device, and means for further adjusting said accounting devices.

3. In a machine of the character described, the combination with accounting mechanism, of a total retaining device detachable from the machine but adapted to be inserted therein and when so inserted serving to control said accounting mechanism, means for further controlling said accounting mechanism, and means for entering completed transactions in the retaining device.

4. In a machine of the character described, the combination with accounting mechanism, of a device detachable from the machine but adapted to be inserted therein and when so inserted serving to successively control and be controlled by said accounting mechanism.

5. In a machine of the character described, the combination with accounting mechanism, of a device detachable from the machine but adapted to be inserted therein and serving to successively control and be controlled by said accounting mechanism, and means for adjusting said accounting mechanism.

6. In a machine of the character described, the combination with accounting mechanism, of a total retaining device detachable from the machine, and having adjustable elements for controlling said accounting mechanism, and means for locking said elements when the device is detached.

7. In a machine of the character described, the combination with accounting mechanism, of a total retaining device detached from the machine and having adjustable elements for controlling said accounting mechanism, means for locking said elements when said device is detached, and means for releasing said locking means by operation of the machine.

8. An accounting machine comprising a detachable total retaining device having elements separately movable, differentially movable elements, means for controlling the movement of the differential elements by the elements of the detachable device and means for thereafter controlling the elements of the detachable device by the differential elements.

9. An accounting machine comprising a plurality of total retaining devices each having separately movable elements, differentially movable elements, means for transferring an entry from a retaining device to the differential elements, means for introducing another entry into the machine, and means for adjusting the total retaining device to position determined by both said entries.

10. In an accounting machine comprising accounting elements, a device detachable from the machine but adapted to be inserted therein, and serving when so inserted to control said accounting elements, and means for locking the accounting elements, said means being released by the insertion of the said detachable device.

11. An accounting machine having means for retaining segregated entries of transactions, said means comprising a plurality of detachable total retaining devices, which devices have means for preventing manipulation thereof when detached from the machine.

12. An accounting machine comprising a plurality of detachable total retaining devices, mechanism in the machine adapted to receive an adjustment determined by a total retaining device, means for readjusting the said mechanism and means for transferring to the total retaining device the entry on said mechanism after readjustment.

13. An accounting machine comprising a plurality of detachable total retaining devices, registering mechanism in the machine controlled by said total retaining devices, accounting mechanism also controlling said registering mechanism and means for transferring to said retaining devices the entry on said registering mechanism.

14. An accounting machine comprising a plurality of detachable total retaining devices, means for setting up in the machine the amount on any one of said devices, means for further adjusting said means in accordance with a transaction, and mechanism for then resetting the total retaining device to a position determined by the further adjustment of said means.

15. An accounting machine comprising a plurality of total retaining devices adapted to be separately inserted in the machine, a registering mechanism, and means whereby the retaining devices and registering mechanism are successively controlled each by the other.

16. An accounting machine comprising accounting elements, a plurality of total retaining devices adapted to be inserted in the machine and serving when inserted to control said accounting elements, means whereby the accounting elements readjust the total retaining devices to a complete entry, and means for entering in the machine at each operation the complete entry on the retaining device employed.

17. An accounting machine comprising accounting elements, a plurality of total retaining devices adapted to be inserted in the machine and serving when inserted to control said accounting elements, means whereby the accounting elements readjust said retaining devices, and means for printing in the machine at each operation the complete entry on the retaining device employed.

18. An accounting machine comprising a plurality of total retaining devices adapted to be separately operated and means for retaining in the machine at each operation thereof an entry of the total on the device employed.

19. An accounting machine comprising printing elements, a total retaining device adapted to be inserted in the machine, and serving when so inserted to control the adjustment of said printing elements, means for readjusting said printing elements, devices whereby said printing elements serve to adjust said retaining device to a complete entry, and means for taking an impression from said printing elements after they are readjusted.

20. An accounting machine comprising a plurality of total retaining devices adapted to be separately operated and means in the machine for printing at each operation the total of transactions on the device employed.

21. In an accounting machine, the combination with an operating mechanism, of means for locking same, a total retaining device detachable from the machine but adapted to be inserted therein, connections by which the insertion of the retaining device served to release said locking means, and means whereby the operating mechanism restores said locking means to locking position.

22. An accounting machine comprising means for locking the machine, detachable total retaining devices adapted to be separately inserted in the machine, and means for releasing said locking means by the insertion of a retaining device, said means also preventing withdrawal of said retaining device.

23. An accounting machine comprising operating mechanism locking means therefor, means normally tending to move said locking means to releasing position, means preventing said releasing movement, a detachable total retaining device by withdrawing said last means and permitting the unlocking of the machine and means for restoring said locking means to normal position.

24. In an accounting machine, the combination with an operating mechanism, and means normally locking same, of a device detached from said machine but adapted to be inserted therein, connections whereby the inserting movement of said device unlocks said locking means, the construction being such that the movement of said connections prevents withdrawal of the inserted device.

25. An accounting machine comprising accounting mechanism and total retaining devices adapted to coöperate with said mechanism, a drawer in the machine for holding said retaining devices, with means normally locking said drawer, and transaction determining keys directly releasing said locking means.

26. An accounting machine comprising accounting mechanism and total retaining devices adapted to coöperate with said mechanism, a drawer in the machine for holding said retaining devices, with means normally locking said drawer, transaction determining keys directly releasing said locking means, and means for retaining said determining keys in depressed position.

27. A total retaining device comprising a series of denominational elements, constructed to be differentially positioned, in combination with a reading device including a plurality of denominational indicators, and means constructed to be engaged by said denominational elements for adjusting said indicators.

28. In a machine of the character described, the combination with printing devices, of a record carrying table normally exposed at the side of the machine, and means for shifting said table to printing position at each operation of the machine, the construction being such that the table may be manually adjusted to the same printing position.

29. In a machine of the character described, the combination with printing devices, of a record carrying table, means for drawing same into printing position at each operation of the machine, the construction being such that the table may be manually moved to the same printing position and locked therein.

30. In an accounting machine, the combination with a record carrying table adapted to be manually moved to printing position, of means automatically actuated by the machine for also moving said table to the printing position if it has not been manually adjusted.

31. In an accounting machine, the combination with a normally locked operating mechanism, of a key and connections for preventing release of said mechanism when the key is adjusted, and a record carrying table for disabling said connection.

32. In an accounting machine, the combination with an operating mechanism, of a manipulative element and connections for locking said mechanism when the element is operated, and a record carrying table for releasing said lock.

33. In an accounting machine, the combination with an operating mechanism, of a lever normally locking same, a special key and an arm operated thereby for preventing the release of the locking lever, and a slidable record carrying table for moving said arm out of the path of said lever.

34. In a machine of the character described, the combination with printing devices, of a record carrying table adjustable to printing position, a platen, a support, and driving spring for said support, a lever subjacent said platen support and having a driving spring, means for moving said support and lever to tension both said springs, and means for latching said subjacent lever, said latching means being controlled by said record table.

35. In an accounting machine, the combination with printing mechanism, of a platen and means for operating same, a lever for also operating said platen, a latch for said lever and means for tripping said latch.

36. In an accounting machine, the combination with printing mechanism, of a platen and means for operating same, a lever for also operating said platen, a latch for said lever and a record carrying table and connections for tripping said latch.

37. In an accounting machine, the combination with an operating mechanism, of a total retaining device normally detached from the machine but adapted to be inserted therein, locking devices for the operating mechanism released by the insertion of the retaining device and a locking device for holding said retaining device in inserted position until the operating mechanism is actuated.

38. In an accounting machine, the combination with type carriers, of a movable table carrying record material, a platen, and an operating mechanism for moving the table carrying the record material into juxtaposition to the type carriers and then operating the platen for the purpose of taking an impression upon the record material from the type carriers.

39. In an accounting machine, the combination with type carriers, of a sliding table normally in position to receive a sales slip, a platen, and means for sliding the table with the sales slip into juxtaposition to the type carriers and then operating the platen for the purpose of taking an impression upon the sales slip from the type carriers.

40. In an accounting machine, the combination with a record carrying table, manually movable into the machine and a latch for holding same in its moved position, of a cylinder having a cam groove, and a lever moving in said groove and serving to inject the table into the machine if it has not been manually so moved and to trip said latch.

41. An accounting machine comprising a self contained total retaining device normally detached from the machine, said retaining device having a plurality of normally locked denominational elements.

42. An accounting device comprising a detachable self contained total retaining device, having a series of normally locked denominational elements, and a series of elements collectively controlling the unlocking of said denominational elements.

43. An accounting device comprising a detachable total retaining device having a series of denominational elements a series of special elements, and means controlled by the special elements normally locking the denominational elements, together with independent means for unlocking the said locking means.

44. An accounting machine comprising a self contained total retaining device normally detached from the machine but adapted to be inserted therein, said retaining device comprising a plurality of denominational elements with means for locking said elements in any one of a plurality of positions.

45. An accounting device comprising a detachable self contained total retaining device having a series of denominational elements, and a series of special elements; and means controlled by said special elements for locking said denominational elements in any one of a plurality of positions.

46. An accounting device comprising a detachable self contained total retaining device having a plurality of denominational rack slides, springs forcing said slides in one direction and means for locking said slides.

47. An accounting device comprising a detachable total retaining device having a plurality of denominational rack slides and a plurality of special slides, springs forcing all said slides in one direction and means controlled by said special slides for locking the denominational slides.

48. An accounting device comprising a detachable self contained total retaining device having a plurality of denominational elements and provisions for holding an identifying plate.

49. An adding and subtracting machine comprising differentially movable elements and keys controlling the movement of same, two racks operated in opposite directions by each element, a register and means for meshing it with either rack, and transfer mechanism acting on one rack for addition or subtraction.

50. An adding and subtracting machine comprising differentially movable elements, racks operated in opposite directions by said elements, a register, means for moving said racks as a whole to cause either set to mesh with said register and transfer mechanism engaging one set of the racks in either position.

51. An adding and subtracting machine comprising registering mechanism, sets of operating devices therefor movable in opposite directions, means for meshing the registering mechanism with either set of operating devices, and transfer mechanism giving both sets of devices an additional increment of movement.

52. An adding and subtracting machine comprising a registering mechanism operable forwardly or reversely, and a transfer mechanism tripped by the registering mechanism when moving in either direction and serving to move said registering mechanism an additional step.

53. An adding and subtracting machine comprising a registering mechanism, differentially movable operating elements, two racks driven with each element in opposite directions, means for meshing said registering mechanism with either set of racks, transfer mechanism moving said racks and a spring tensioned by the transfer movement of said racks and serving to return the said racks.

54. In an accounting machine, the combination with an accumulator, of two sets of actuators therefor connected to move in opposite directions for the purpose of adding to or subtracting from said accumulator, and means for establishing operative relation between the accumulator and either set of actuators.

55. An adding and subtracting mechanism comprising operating elements, racks operated by said elements in opposite directions, a registering mechanism, and a key for shifting said racks to bring a desired set into operative relation with the registering mechanism.

56. In a registering mechanism, the combination with a register, of means for resetting same, and a zero stop for said register, comprising two oppositely beveled bars, means for sliding one bar on the other, and pawls carried by said register and adapted to be stopped when said bar has been slid.

57. In a registering mechanism, the combination with a register, and a slotted shaft on which same is mounted, of means for moving said register to zero position, and devices for stopping said register at zero position; said devices comprising a pawl moved with the register, and a bar in the slot in the register shaft movable into and out of the path of said pawls.

58. In a registering mechanism, the combination with a differentially adjustable operating element, of a pair of intergeared racks operated in opposite directions by said element, a registering element, and means for engaging said registering element with either of the racks.

59. In a registering mechanism, the combination with a differentially adjustable operating element, of a pair of racks, a gear driven by said operating element and meshing with said racks to drive the same in opposite directions, a registering element, and means for producing relative lateral movement between said registering element and racks to connect said element with either of the racks.

60. In a registering mechanism, the combination with a registering element and operating devices for moving said element forward or reversely at will, of a transfer device controlled by said registering element when moving in either direction, and serving when actuated to move the operating devices an extra distance.

61. In a machine of the class described, the combination with a series of recording devices, and rack segments permanently connected to said recording devices, of a total retaining device insertible in the machine, and having denominational slides, a register constructed to adjust said rack segments differentially, and connections whereby said segments may adjust said retaining device slides in correspondence with the adjustment of the recording devices.

62. In a machine of the class described, the combination with accounting mechanism, of a total retaining device detachable from the machine, and having adjustable elements for controlling said accounting mechanism, and means for securing said elements in adjusted position.

63. In a machine of the class described, the combination with an accounting mechanism, of a total retaining device detachable from the machine and having adjustable elements controlling the accounting mechanism, and means for locking said elements against retrograde movement when the device is detached.

64. An accounting mechanism comprising a self-contained total retaining device normally detached from the machine but adapted to be inserted therein, said total retaining device comprising a plurality of denominational elements with means for locking said elements against retrograde movement in any one of a plurality of positions.

65. In an accounting machine, the combination with an accounting mechanism, of a total retaining device detachable from the machine but adapted to be inserted therein, said device comprising a plurality of slides with means for retaining the slides in different positions of adjustment.

66. In a machine of the class described, the combination with accounting mechanism, of a total retaining device detachable from the machine and having adjustable slide elements for controlling said accounting mechanism, and means for retaining the elements in adjusted position.

67. In an accounting machine, the combination with an operating mechanism, of an accumulator, a detachable totalizer, and means actuated by the operating mechanism under the control of the totalizer for transferring the amount on the totalizer to the accumulator.

68. In an accounting machine, the combination with an accumulator forming a part thereof, of an operating mechanism, a totalizer detachable from the machine but adapted to be inserted therein, and means actuated by the operating mechanism under the control of the totalizer when inserted in the machine for adding to the accumulator the amount on the totalizer.

69. In an accounting machine, the combination with an accumulator, of an operating mechanism, a locking means therefor, a detachable totalizer constructed to operate the locking means when attached to the accounting machine, and means actuated by the operating mechanism under the control of the totalizer for transferring the amount thereon to the accumulator.

70. In an accounting machine, the combination with an operating mechahism therefor, of an accumulator forming a part of the accounting machine, a totalizer normally detached from the machine but adapted to be attached thereto, means actuated by the operating mechanism under the control of the totalizer for transferring the amount thereon to the accumulator, and devices for adding an item to the accumulator in addition to the transferred amount.

71. In an accounting machine, the combination with an operating mechanism therefor, of an accumulator, a totalizer normally detached from the machine but adapted to be attached thereto, means actuated by the operating mechanism under the control of the totalizer for transferring the amount thereon to the accumulator, and devices for subtracting an amount from the transferred accumulation.

72. In an accounting machine, the combination with an accumulator, of independent sets of actuators therefor, and a detachable device for controlling one set of said actuators.

73. In an accounting machine, the combination with an accumulator, of independent sets of actuators therefor, and means for establishing an operative relation between the accumulator and both sets of actuators during an operation of the machine.

74. In an accounting machine, the combination with an accumulator, of independent sets of actuators therefor, means for establishing an operative relation between the accumulator and both sets of actuators, and type carriers controlled by one set of said actuators.

75. In an accounting machine, the combination with an accumulator, of independent sets of actuators therefor, means for establishing an operative relation between the accumulator and both sets of actuators for the purpose of entering a sum on said accumulator, a series of type carriers, and means for transferring the sum on the accumulator to the type carriers.

76. In an accounting machine, the combination with an accumulator, of actuators therefor, a totalizer detachable from the machine but adapted to be attached thereto, and means for transferring the amount on the accumulator to the totalizer when attached to the machine.

77. In an accounting machine, the combination with an accumulator, of actuators therefor, a totalizer detachable from the machine but adapted to be attached thereto, means for transferring the amount on the accumulator to the totalizer when attached to the machine, and means for recording the transferred amount.

78. In a machine of the class described, a total retaining device comprising a plurality of amount slides settable in different positions, and a single pivoted locking device constructed to lock all of said slides in any of their positions.

79. In a machine of the class described, a total retaining device comprising a plurality of amount slides, and a single pivoted lock for all of said slides.

80. In a machine of the class described, a total retaining device comprising a plurality of amount slides settable to different positions, and a single pivoted locking element constructed to lock the slides in any of their set positions with a spring normally tending to force said lock to locking position.

81. In a machine of the class described, a total retaining device comprising a series of amount slides, and an identifying slide with a single pivoted locking device having one portion engaging all of said amount slides and another portion engaging the identifying slide.

82. In a machine of the class described, a total retaining device comprising a series of amount slides, and a single pivoted locking device for locking them in any of their set positions, an identifying slide having a notch therein adapted to receive a portion of the locking device, and means for adjusting the identifying slide so as to bring its notch into a position wherein the locking device may be operated.

83. In a machine of the class described, a total retaining device comprising a plurality of amount slides, and a plurality of identifying slides having notches therein and a pivoted locking device having a portion positioned to engage and lock the amount slides in any of their set positions and another portion movable into the notches of all of the identifying slides.

84. In a machine of the class described, the combination with accounting mechanism and means normally locking the same from operation with a spring normally tending to release said locking means, of a total retaining device adapted when inserted in the machine to release said spring locking means.

85. In a machine of the class described, the combination with a machine having accounting mechanism and spring controlled means normally locking said machine, of a total retaining device adapted to release said locking means when the same is inserted in the machine, and a special key preventing the release of said locking means when the key is depressed.

86. In a machine of the class described, the combination with a machine having accounting mechanism and spring controlled devices normally locking said machine, of a total retaining device detachable from the machine and when inserted in the machine serving to release the locking means, a special key preventing release of said locking means, and a table which when inserted in the machine causes release of said locking means irrespective of the position of said key.

87. In a machine of the class described, the combination with a main operating mechanism, of a register, and means for successively adding two amounts on the register and turning the same to zero at a single operation of the operating mechanism.

88. In a machine of the class described, the combination with a main operating mechanism, of a register, means for successively adding two amounts on the register and turning the same to zero at a single operation of the operating mechanism, and means also operable during the same operation for recording the total of the two amounts added on the register.

89. In a machine of the class described, the combination with a main operating mechanism, of a register, means for successively adding two amounts on the register and turning the same to zero at a single operation of the operating mechanism, and two independent means for predetermining the amounts to be added on said register.

90. In a machine of the class described, the combination with a main operating mechanism, of a register, means for successively adding two amounts on the register and turning the same to zero at a single operation of the operating mechanism, two independent means for predetermining the amounts to be added on said register, and means for recording the total of the two amounts added on the register.

91. In a machine of the class described, the combination with a register, of operating mechanism, and means for successively entering two amounts on the register and recording the total thereof at a single operation of the operating mechanism.

92. In a machine of the class described, the combination with a main operating mechanism, having an invariable extent of operation, of a register, means for actuating the register twice in one direction and once in the reverse direction at a single operation of the machine, and means for stopping the register at zero the last time it is actuated.

93. In a machine of the class described, the combination with a differentially adjustable operating element, of a pair of intergeared racks operating in opposite directions by said element, a registering element normally in operative relationship with one rack and a depressible key for establishing operative relationship between said registering element and the other rack.

94. An accounting machine comprising a plurality of total retaining devices adapted to be separately operated, means for retaining in the machine at each operation thereof an entry of the total on the device employed, and as an incident thereto an entry to identify the total retaining device employed.

95. In a machine of the class described, the combination with a plurality of detachable accumulators, of actuating means therefor, and recording mechanism for recording the total accumulated on any desired accumulator and as an incident thereto recording special characters to identify the accumulator from which the total is recorded.

96. In a machine of the class described, the combination with a plurality of accumulators each comprising a plurality of denominational elements, of special elements associated with each accumulator, actuators for the denominational elements, differentially movable members for the special elements, type carriers controlled by the actuators for printing the amounts entered on the accumulators, and type carriers controlled by the differentially movable members for the special elements for recording special characters beside the amounts recorded to identify the accumulator actuated.

97. In a machine of the class described, the combination with a plurality of accumulators each comprising a plurality of movable denominational elements, of special elements associated therewith, and recording mechanism under the control of the actuators for recording the amount of actuation of any accumulator and under the control of the special elements of the accumulator actuated for recording special characters to identify the accumulator actuated.

98. In a machine of the class described, the combination with a plurality of total retaining devices each comprising a plurality of denominational elements and special elements, and each adapted to be inserted into the machine, of actuators for the denominational elements, type carriers under the control of the actuators for recording the totals entered on the retaining devices, and type carriers under the control of the special elements for recording special characters to identify the retaining devices actuated.

99. In a machine of the class described, the combination with accounting elements, of a plurality of total retaining devices, each comprising a plurality of denominational elements and special elements and adapted to be inserted in the machine to cause the denominational elements to control the accounting elements, means whereby the accounting elements readjust said retaining devices, type carriers controlled by the accounting elements for printing at each operation the total entered on the retaining device employed, and type carriers controlled by the special elements for printing special characters to identify the retaining device employed.

100. In a machine of the class described, the combination with an accumulator, of actuators therefor, a plurality of totalizers detachable from the machine but adapted to be attached thereto, means for transferring the amount on the accumulator to the totalizer when attached to the machine, and means for recording the transferred amount and automatically and as an incident thereto special characters to identify the detachable totalizer inserted into the machine.

101. In a machine of the class described, the combination with a main operating mechanism, of a registering mechanism operable forwardly or reversely, rack means for operating the same, and transfer mechanism driven by the operating mechanism for positively giving said rack means an additional increment of movement to give the registering mechanism an additional step of movement in either direction.

102. In a machine of the class described, the combination with a main operating mechanism, of a registering mechanism operable forwardly or reversely, rack means for operating the same, transfer mechanism driven positively by the operating mechanism for giving said rack means an additional increment of movement to give the registering mechanism an additional step of movement in either direction, and spring means serving to restore the rack means.

103. In a machine of the class described, the combination with a total retaining devices comprising; a series of amount slides, a single pivoted locking device for locking any of them in their set positions and a plurality of identifying slides having notches normally out of alinement with each other and with a portion of the locking device; of means for alining the identifying slides so that their notches are brought into position wherein the locking device may be operated.

104. In a machine of the class described, the combination with an operating mechanism, of a total retaining device comprising a series of amount slides, a single pivoted locking device for locking them in any of their set positions and a plurality of identifying slides having notches normally out of alinement with each other and with a portion of the locking device; and means operated by the main operating mechanism for adjusting the identifying slides so that their notches are brought into positions wherein the locking device may be operated.

105. In a machine of the class described, the combination with an accumulator comprising a plurality of denominational elements normally locked against movement, releasing means therefor, printing mechanism adapted to coöperate with said accumulator and including type carriers normally out of alinement with each other, and operating means for alining said type carriers to permit said releasing means to release said denominational elements.

106. In a machine of the class described, a total retaining device comprising a plurality of amount slides and a single pivoted lock for all of said slides, and an operating plunger for operating said lock to release said slides.

107. In a machine of the class described, a total retaining device comprising a plurality of amount slides settable to different positions, a single pivoted locking element constructed to lock the slides in any of their set positions and a spring normally tending to force said lock to locking position; and an operating plunger for positively moving said locking mechanism out of locking position against the action of its spring.

108. In a machine of the class described, the combination with an accumulator comprising denominational elements, means for locking the elements in any of their positions, a device normally engaging said locking means and thereby positively holding the same from being moved from unlocking position, an element for moving said device out of preventive position, and an element for then positively moving the locking means out of locking position.

109. In a machine of the class described, the combination with an accumulator, of independent sets of actuators therefor, means for establishing an operative relation between an accumulator and both sets of actuators for the purpose of entering a sum on said accumulator or entering an amount thereon and subtracting another amount therefrom, a series of type carriers, and means for transferring the sum or difference on the accumulator to the type carriers.

110. In an accounting machine, the combination with an accumulator, of independent sets of actuators therefor, means for establishing an operative relation between the accumulator and both sets of actuators during an operation of the machine, and a manipulative device for preventing actuation of one of the sets of actuators when desired.

111. In a machine of the class described, the combination with an operating mechanism, of a total retaining device normally detached from the machine but adapted to be inserted therein, a locking device for the operating mechanism released by the insertion of the retaining device, a locking device for holding said retaining device in inserted position and adapted to be released by the operating mechanism, and manipulative means for releasing said device before the machine is operated, if desired.

112. In a machine of the class described, the combination with operating mechanism, of locking means therefor, detachable total retaining devices adapted to be separately inserted in the machine, means for releasing said locking means by the insertion of a retaining device, said means also preventing withdrawal of said retaining device, and manipulative means for effecting the releasing of the retaining device.

113. In a machine of the class described, the combination of a plurality of detachable total retaining devices each comprising a plurality of differentially movable slides, differentially movable members in a machine adapted to coöperate therewith, and a flash normally in the path of movement of the members in the machine and adapted to be moved out of such position upon operation of the machine.

114. In a machine of the class described, the combination with a plurality of type carriers, or actuating slides therefor, means controlling the extent of movement of the slides, a driver for simultaneously moving the slides and having an invariable extent of movement, and spring means between the slides and the driver permitting different extents of movement of the slides and an invariable extent of movement of the driver.

115. In a machine of the class described, the combination with a plurality of type carriers, of actuating slides therefor, a plurality of total retaining devices any one of which when inserted in the machine limits the extent of movement of the slides, a driver for the slides and having an invariable extent of movement, and spring means between the slides and the driver permitting different extents of movement of the slides and an invariable extent of movement of the driver.

116. In a machine of the class described, the combination with an accounting device and differential mechanism for operating it, of a plunger for controlling the movement of the differential mechanism, a movable member for operating the plunger, a record device, and a spring between said movable member and the plunger so that operation of the plunger may be prevented by the record device.

117. In a machine of the class described, the combination with an accounting device and differential mechanism for operating it, of a plunger for controlling the movement of the differential mechanism, a movable member for operating the plunger, a record device, a spring between said movable member and the plunger so that operation of the plunger may be prevented by the record device, and a separate means for controlling the differential mechanism for the purpose of altering the final setting of the accounting device.

118. In a machine of the class described, the combination with a plurality of amount receiving devices normally detached from the machine and adapted to be separately inserted in the machine of a registering device; and means whereby the registering device may control the inserted amount receiving device to place an amount thereon.

119. In a machine of the class described, the combination with a plurality of amount receiving devices normally detached from the machine and adapted to be separately inserted in the machine, of differential mechanism in the machine, means for entering amounts on the differential mechanism, and means controlled by the differential mechanism for placing an amount on the inserted amount receiving device.

120. In a machine of the class described, the combination with a main operating mechanism, of a registering mechanism operable forwardly or reversely, actuating means for operating the same, and transfer mechanism adapted to cause said actuating means to move an additional increment in a constant direction to give the registering mechanism an additional step of movement in either direction.

121. In a machine of the class described, the combination with a main operating mechanism, of a registering mechanism operable forwardly or reversely, actuating means for operating the same, and transfer mechanism driven by the operating mechanism for positively giving said actuating means an additional increment of movement in a constant direction to give the registering mechanism an additional step of movement in either direction.

122. In a machine of the class described, the combination with a main operating mechanism, of a registering mechanism operable forwardly or reversely, actuating means for operating the same, and transfer mechanism driven by the operating mechanism for giving said actuating means an additional increment of movement in a constant direction to give the registering mechanism an additional step of movement in either direction.

123. In a machine of the class described, the combination with a register mechanism operable forwardly or reversely, of actuating mechanism therefor, and means controlled by the registering mechanism for positively imparting an additional movement to the actuating mechanism to move the registering mechanism an additional movement in either direction.

124. In a machine of the class described, the combination with a register including denominational elements, of reciprocating actuating racks therefor, means for engaging said actuating racks and registering elements for movement of the elements in either direction, transfer devices including a single set of tripping elements constructed to be tripped by said register elements when the same are moving in either direction and when so tripped permitting an additional movement of said actuating racks in a constant direction.

125. In a machine of the class described, the combination with a register including denominational elements, of reciprocating actuating racks therefor, means for engaging said actuating racks and registering elements for movement of the elements in either direction, transfer devices including tripping elements constructed to be tripped by said register elements when the same are moving in either direction and when so tripped permitting an additional movement of said actuating racks in a constant direction.

126. In a machine of the class described, the combination with a register including denominational elements, of reciprocating actuating racks therefor, means for engaging said actuating racks and registering elements for movement of the elements in either direction, transfer devices including a single set of tripping elements constructed to be tripped by said register elements when the same are moving in either direction and when so tripped permitting an additional movement of said actuating racks in a constant direction, and means for positively moving said racks the additional movement.

127. In a machine of the class described, the combination with a register, including denominational elements, of reciprocating actuating racks therefor, means for engaging said actuating racks and register elements for movement of the elements in either direction, transfer devices including tripping elements constructed to be tripped by said register elements when the same are moving in either direction and when so tripped permitting an additional movement of said actuating racks in a constant direction, and means for positively moving said racks the additional movement.

128. In a machine of the class described, the combination with a main operating mechanism, of a register including denominational elements, reciprocating actuating racks operated by the main operating mechanism, means for engaging said actuating racks and register elements for movement of the elements in either direction, transfer devices including tripping elements constructed to be tripped by said register elements when the same are moving in either direction and when so tripped permitting additional movement of said racks in a constant direction, the additional movement being given thereto by the main operating mechanism.

129. In a machine of the class described, the combination with differential mechanism and register actuating mechanism moved thereby, of actuating mechanism having an increment of movement independent of the differential mechanism, transfer devices for giving the actuating mechanism said independent increment of movement, spring means between the differential mechanism and actuating mechanism permitting the additional increment of movement of the latter, registering elements operated by the actuating mechanism in either direction and having means for preparing the transfer devices, during movement of the elements in either direction, for giving the actuating mechanism the independent increment of movement, and means for engaging said elements and the actuating racks to provide for movement of the register elements in either direction.

130. In a machine of the class described, the combination with a main operating mechanism, of a register, and means for adding two amounts on the register and turning the same to zero at a single operation of the operating mechanism.

131. In a machine of the class described, the combination with a main operating mechanism, of a register, means for adding two amounts on the register and turning the same to zero at a single operation of the operating mechanism, and means also operable during the same operation for recording the total of the two amounts added on the register.

132. In a machine of the class described, the combination with a main operating mechanism, of a register, means for adding two amounts on the register and turning the same to zero at a single operation of the operating mechanism, and two independent means for predetermining the amounts to be added on said register.

133. In a machine of the class described, the combination with a register, of operating mechanism, and means for entering two amounts on the register and recording the total thereof at a single operation of the operating mechanism.

134. In a machine of the class described, the combination with a plurality of detachable record means, of means positioned in the machine for entering amounts thereon, and a printing means controlled by the record means for printing the total of the amounts entered on any one of the record means and as an incident thereto printing a special character to identify the record means employed.

135. In a machine of the class described, the combination with an accounting device, of a record device having movable elements, and detachable from the machine but adapted to be inserted therein, and means under the control of the accounting device for adjusting said movable elements to represent the amount on the accounting device.

136. In a machine of the class described, the combination with a totalizing mechanism, of a device normally detached from the machine but adapted to be inserted therein and having differentially movable elements which when the device is inserted into the machine are adapted to be controlled by said totalizing mechanism.

137. In a machine of the class described, the combination with an accounting mechanism, of a device detachable from the machine and having adjustable elements adapted to be controlled by the accounting mechanism when the device is in the machine, and means for locking said elements against movement when said device is detached from the machine.

138. In a machine of the class described, the combination with an accounting mechanism, of operating mechanism therefor, a device detachable from the machine and having adjustable elements adapted to be controlled by said accounting mechanism when inserted into the machine, means for locking said elements against movement when the device is detached from the machine, and means for automatically releasing said locking device upon operation of the operating mechanism.

139. In a machine of the class described, the combination with accounting elements, of a plurality of devices detachable from the machine but adapted to be inserted therein, and each having adjustable elements adjusted to be controlled by the accounting device to represent amounts, and means for entering in the machine at each operation the amount entered on said adjustable elements of the device employed.

140. In a machine of the class described, the combination with a main operating mechanism, of accounting elements, a plurality of devices detachable from the machine but adapted to be inserted therein and having adjustable elements controlled by the accounting device to represent amounts when inserted into the machine, and means for printing a record in the machine at each operation of the amount entered on the detachable device employed and as an incident thereto print a special character to identify the device employed.

In testimony whereof I affix my signature in the presence of two witnesses.

EDMUND S. CHURCH.

Witnesses:
 ROY C. GLASS,
 CARL W. BEUST.